(12) United States Patent  
Fleming et al.

(10) Patent No.: US 11,003,683 B2  
(45) Date of Patent: May 11, 2021

(54) VISUAL DATA MINING USING VIRTUAL REALITY AND AUGMENTED REALITY

(71) Applicant: The Regents of the University of California, Oakland, CA (US)

(72) Inventors: Lee Fleming, Orinda, CA (US); Guan-Cheng Li, Albany, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 464 days.

(21) Appl. No.: 15/896,815

(22) Filed: Feb. 14, 2018

(65) Prior Publication Data

US 2018/0232428 A1    Aug. 16, 2018

Related U.S. Application Data

(60) Provisional application No. 62/458,964, filed on Feb. 14, 2017.

(51) Int. Cl.

| | |
|---|---|
| *G06F 16/20* | (2019.01) |
| *G06F 16/26* | (2019.01) |
| *G06T 19/00* | (2011.01) |
| *G06F 3/01* | (2006.01) |
| *G06F 3/0481* | (2013.01) |
| *G06T 11/20* | (2006.01) |
| *G02B 27/01* | (2006.01) |

(52) U.S. Cl.
CPC ............ *G06F 16/26* (2019.01); *G06F 3/011* (2013.01); *G06F 3/017* (2013.01); *G06F 3/04815* (2013.01); *G06T 11/206* (2013.01); *G06T 19/00* (2013.01); *G06T 19/003* (2013.01); *G06T 19/006* (2013.01); *G02B 27/017* (2013.01)

(58) Field of Classification Search
None
See application file for complete search history.

(56) References Cited

U.S. PATENT DOCUMENTS

| | | | | |
|---|---|---|---|---|
| 8,902,224 B2* | 12/2014 | Wyeld | ................... | G06F 16/248 345/419 |
| 2007/0143667 A1* | 6/2007 | Deaton | ................... | G06F 16/10 715/205 |
| 2007/0208719 A1* | 9/2007 | Tran | ....................... | G06F 16/951 |

* cited by examiner

*Primary Examiner* — Belix M Ortiz Ditren

(74) *Attorney, Agent, or Firm* — McDonnell Boehnen Hulbert & Berghoff LLP

(57) ABSTRACT

Disclosed are methods and systems that help to visualize large groups of documents in a virtual reality or augmented reality environment comprising a three-dimensional (3D) space. An example method involves a computing device: determining a group of elements based at least in part on the one or more input parameters; determining one or more attributes based at least in part on the one or more parameters, the group of elements, or both; determining, for each element from the group, a respective location in a 3D space, based on one or more of the attributes; displaying a 3D graphical environment representing the 3D space, wherein each element from the group is represented in the 3D graphical environment by a graphic object at its respectively determined location in the 3D space; and enabling user interaction with the graphic objects in the 3D graphical environment.

32 Claims, 15 Drawing Sheets

VISUAL DATA MINING USING VIRTUAL REALITY AND AUGMENTED REALITY

GOVERNMENT SUPPORT

This invention was made with government support under Grant Number 1360228 awarded by the National Science Foundation. The government has certain rights in the invention.

BACKGROUND

This disclosure generally relates to databases, data processing, datamining, and prediction of data trends. More particularly, this disclosure relates to a system and method for visual datamining in a three-dimensional (3D) virtual reality space or a 3D augmented reality space. The system and method can be used, for example, to visualize and search any set of documents and predict the probability of future occurrences, including patent references, non-patent references, virtual patent markers, commercial products, product specifications, business data, press releases, news, court proceeding reports, and so forth.

Traditionally, data mining is a challenging task in the era of "big data." Data mining is a crucial step to make informed decisions by researchers, scientists, and businesses. The amount of digital documents available in public and non-public databases makes it difficult to find relevant information and also understand a "big picture" of certain research problems.

For example, the global pool of patent documents includes millions of documents. Patent offices of many countries publish patent documents to make them publically available. The patent publication process serves an important public interest policy concerned with the promotion of science and useful arts. Typically, a patent office publishes a patent document upon a grant of a letters patent associated with a particular invention. The patent offices can also publish patent applications within eighteen months since the filing date depending on local patent regulations of selected countries. Publications of granted patents and patent application publications may differ from one another. Moreover, the patent offices can publish patent documents after an opposition or examination process. Each patent document is typically very technical, as it shall explain the nature of an invention in sufficient details so as to enable those skilled in the art to make and use the described invention. For these reasons, searching of patent literature became important for not only patent practitioners and examiners, but also for businesses, universities, and individual inventors seeking to understand the current state of the art in a particular technology domain. However, patent searching is a difficult process, which often requires proper training. As demonstrated by challenges to the validity of patents after granting based on missed prior art, patent searching remains an error prone process.

Patent literature is commonly stored in electronic databases. A patent searcher may use search engines to retrieve patent documents of interest. For example, the patent searcher can input search queries to the search engine to get certain search results. This process can be repeated with new search queries to narrow down the search results. The patent searcher can use key words, classification codes, patentee names, inventor names, and other parameters to build search queries. The search engines may enable the user to use operators to link these parameters and provide more relevant search results. The format of search engine results is typically tabular, however, which makes it difficult for the user to comprehend large amounts of data, and makes it more likely that pertinent prior art will be missed.

Although the search engines are developed instruments, nevertheless conducting a high quality patent search is a difficult task for many searchers. It is common that searchers can struggle to find relevant prior art documents or understand industry trends. The same problems exist in other areas of data mining. For example, it may be also difficult to conduct a high quality trademark search, design search, business information search, competitive product search, scientific-related search, and others.

Yet another problem lies with visualization of large-scale data. Today, analytical results are sometimes visualized as two-dimensional diagrams, tables, and images. Many find this type of visualization ineffective and inconvenient to use or understand. Accordingly, a need exists in the art to improve data research and mining, as well as data visualization and prediction. The ability to visualize and predict trends would be useful to the strategic analysis of science, technologies, patenting, patenting litigation, industries, competitors, and product markets.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. The following aspects of this disclosure overcome at least some drawbacks known in the art.

According to one aspect of this disclosure, there is provided a method for visual data mining implemented by a computing device. The method comprises: (a) receiving, by a computing device, input data indicating one or more parameters, wherein the one or more parameters relate to a type of element, wherein a database comprising multidimensional data includes a plurality of elements of the type; (b) determining, by the computing device, a group of elements from the plurality of elements based at least in part on the one or more first parameters; (c) determining, by the computing device, a plurality of first attributes based at least in part on the one or more parameters, the group of elements, or both; (d) determining, by the computing device, for each element from the group, a respective location in a three-dimensional (3D) space, wherein the respective location is determined based on at least some of the plurality of first attributes; (e) causing a graphic display device to display a 3D graphical environment representing the 3D space, wherein each element from the group is represented in the 3D graphical environment by a graphic object at the respectively determined location of the element in the 3D space; (f) enabling, by the computing device, user interaction with the 3D graphical environment and the graphic objects therein, and (g) applying machine learning and other statistical methods to predict the visualized trends in the future.

To do In another aspect, a system is disclosed. The system comprises at least a display interface operable to control a graphic display, at least one processor, and program instructions stored on a non-transitory computer readable medium and executable by the at least one processor. The program instructions are executable by the at least one processor to: (a) receive input data indicating one or more parameters, wherein the one or more parameters relate to a type of element, wherein a database comprising multidimensional data includes a plurality of elements of the type; (b) determine a group of elements from the plurality of elements based at least in part on the one or more first parameters; (c) determine one or more attributes based at least in part on the one or more parameters, the group of elements, or both; (d) determine, for each element from the group, a respective location in a 3D space, wherein the respective location is determined based on one or more of the attributes; (e) cause the graphic display to display a 3D graphical environment representing the 3D space, wherein each element from the group is represented in the 3D graphical environment by a graphic object at the respectively determined location of the element in the 3D space; and (f) enable user interaction with the 3D graphical environment and the graphic objects therein.

Additional objects, advantages, and features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limited in the figures of the accompanying drawings, in which like references indicate similar elements and in which.

DETAILED DESCRIPTION OF EXAMPLE EMBODIMENTS

I. Introduction

Figure 1:
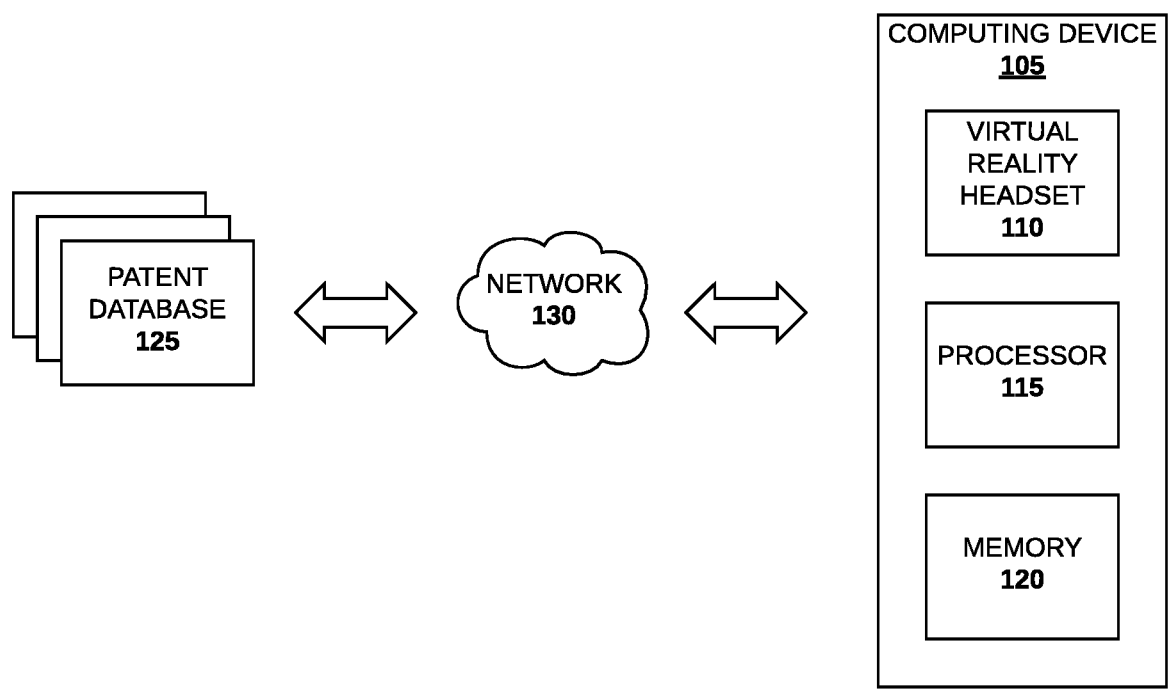
FIG. 1 shows a diagram illustrating a system environment suitable for practicing a method for visual data mining according to one embodiment.

This disclosure includes a system and a method for visual data mining using a 3D virtual reality space or a 3D augmented reality space (collectively referred to as a "3D space" for simplicity). Although this disclosure primarily focuses on methods for visualization and research of patent documents, those skilled in the art should appreciate that the present teachings are also applicable to visualize non-patent documents, including technical literature documents, research papers, theses, scientific papers, commercial papers, business or trade related information, marketing information, virtual patent markers, and so forth.

Visualizing and predicting large-scale and multi-dimensional data in the 3D space provides many advantages compared to traditional methods. For example, researchers or data analysts can perceive large-scale data in a more efficient manner and find relevant documents faster. They can also get insights about the visualized data from different or new perspectives. For example, the 3D visualization methods of this disclosure allow for performing mapping to assist in the analysis of large-scale data and reveal correlations between selected attributes of the visualized data. In addition, the 3D visualization methods of this disclosure can enable tracking and prediction of trends. Other benefits and uses of example embodiments are also possible.

According to embodiments of this disclosure, the system for visual data mining includes at least one computing device, such as a personal computer, server, or workstation that can access certain multi-dimensional data, such as patent data, and cause displaying the data in a 3D space. The data can be remotely stored in a database. The data can be displayed using a virtual reality display equipment such as a wearable virtual reality headset, virtual reality helmet, head-mounted display, and the like.

The multi-dimensional data can include a plurality of "elements." Each element can be a document, a portion of document, a web page, an image, a video, and so forth. For example, each element can be a patent reference such as a granted patent or published patent application. In other embodiments, each element can be one or more claims of a patent reference (or any other portion of patent reference). Each of elements can be represented in the 3D space as a graphical object. Some examples of the graphical objects include, but not limited to, a two-dimensional (2D) graphical element, a 3D graphical element, a cube, a sphere, a pyramid, and so forth. Characteristics of graphical objects can depend on certain attributes of documents.

For example, when the system is used to visualize patent documents (also referred herein to as "patent references"), characteristics of graphical objects depend on certain predetermined attributes of patent references. In one embodiment, dimensions of the graphical objects can be selected based on a number of forward citations. In another example, a color of the graphical objects can be selected based on another attribute such as a patent owner name. Generally, patent reference attributes can be selected from one or more of the following: a keyword, a patent classification code, an inventor name, an assignee name, a patent owner name, a backward citation, a forward citation, a count of backward citations, a count of forward citations, a country, an examiner's name, an agent's name, a filing date, a publication date, a priority date, an application number, a publication number, a number of blocking actions generated by the patent reference, a number of inventors, a level of difficulty in getting the patent reference granted, a period from a patent application filing date to a patent issue date, number of office actions received in the patent reference, a patent examiner name, patent attorney name, a patent agent name, a patent firm name, an invalidation record, identification concerning payment of renewal patent fees, and the financial value of a patent.

In some embodiments, each graphical object can represent a company, business, firm, organization, or institution, rather than a single document such as a patent reference. Moreover, in some embodiments, each graphical object can represent a group of patent references or other documents.

For example, a single graphical object in a 3D space can represent an entire patent portfolio of a given company, product offering, or strategy space of a certain firm. In other embodiments, each object could represent a single claim.

In some embodiments, a user can select patent reference attributes or parameters for visualizing the patent references. Generally, three patent reference attributes or parameters are required to be selected to create a 3D space. For example, patent references can be visualized in a 3D environment based on a combination of three or more attributes, such as three or more different key terms, or such as one or more key words, phrases of key words, patentee names, and classification codes.

However, in example embodiments, many more attributes may be analyzed to determine a location of a patent-reference object in a 3D space. For example, Principal Component Analysis (PCA) or similar methods may be utilized to consider a large number of attributes, and determine a vector that places a graphic object for each patent reference in a meaningful location in a 3D space.

For example, the frequency of four or more terms in each reference from a group of patent references may be determined. The frequency of each term is thus a distinct attribute that is analyzed for each reference in the group. PCA can then be applied to the group of patent references, based on the comparative frequencies with which the four or more terms appear in the references, to determine the values of the three principal components for each reference, which serve as coordinates for the graphic object representing the reference in a 3D space defined by the three principal components. As a result, the distance between patent-reference graphic objects in the 3D space will tend to provide a visual indication of the similarity (or lack thereof) between the corresponding patent references.

In some embodiments, other types of patent-reference attributes can be analyzed via PCA or similar techniques, in addition or in the alternative to terms. Examples include but are not limited to overlap of common classification codes assigned to these patent references, number of citation overlaps, or number of citations linkages between patents. By varying the attributes that are utilized, different spatial arrangement of patent-reference objects in 3D space are possible, such that distances between the objects in a 3D environment can visually indicate different types of similarity (or lack thereof) between the same group of references. For example, in other embodiments, PCA can utilize attributes such as geographical proximity, citation overlap, blocking relationship overlap (e.g., patentability issues under 35 U.S.C. § 101 through 103), social attributes, patent classification codes (e.g., similarity or dissimilarity in patent classes), among other possibilities.

Further, when PCA or similar techniques are used to place patent-reference objects in a 3D space, the resulting spatial arrangement of the patent-reference objects can be such that objects are grouped or distributed in the 3D space such that objects representing references that are strongly correlated or highly related to a particular attribute (such as a particular term) will be clustered close to one another (e.g., in a "blob" or "neighborhood" of references), and generally located within or near to particular sub-space in the larger 3D space.

By using virtual reality display equipment, users can be positioned within a 3D space (or more specifically in a 3D virtual- or augmented-reality environment), where the graphic objects for multiple patent references are shown and arranged in a meaningful manner. Graphical "markers" or "signposts" may indicate "neighborhoods" within the 3D space. These neighborhoods can be conceptualized as 3D sub-spaces (e.g., "blobs" or "clouds") within the larger 3D space. For example, graphical signposts or markers for different patent owners may be located throughout the 3D space, such that graphical objects (referred to as "orbs" for ease of explanation) for patents owned by a certain assignee tend to be closer to the signpost for that assignee. As a result, orbs for references with at least one common attribute (e.g., a common patent owner or relatively high frequency of a particular key term) may be grouped around the signpost for the common attribute in the 3D space.

Accordingly, in some embodiments graphic markers for certain attributes (e.g., certain key terms) may also be placed in the 3D space, at locations that indicate a relationship between nearby patent-reference objects and the corresponding attributes. For instance, in an exemplary 3D environment, patent-reference objects can be grouped or arranged around graphic markers for patent owners (assignees) or graphic markers representing certain terms relating to a particular technology space and/or patent owner. In some embodiments, each attribute marker or signpost can be text and/or graphics that is visible in the 3D space and arranged between patent-reference orbs according to the attribute represented by the signpost and the relationships of the orbs thereto. For example, a centroid of an assignee marker can be determined or calculated by determining a location in the 3D space that is equidistant from all patent references (i.e., orbs) that are owned by the assignee. Accordingly, the signpost for the key term or assignee may displayed at the centroid in the 3D space. As another example, coordinates of a key term marker could be determined based on the frequency with which the key term occurs in patent references. For instance, distances to all references or a subset of references can be determined based on the respective frequencies with which the term occurs in each reference (e.g., with shorter distances corresponding to greater frequency of the term in a reference), and a location may be determined based on these distances. (Note that the location of the marker could comply with all determined distances or be a best fit that attempts to satisfy all distances as closely as possible.) Other techniques for determining the locations of attribute signposts are also possible.

As noted above, a user can navigate, orient, and transition within the 3D space to view patent-reference objects from different locations and perspectives. The user can also interact with the objects in the 3D space. For example, the user can select or "touch" one of the patent-reference orbs in the 3D space. Once selected or touched, certain relevant information of the orb can be displayed. For example, a title, patent number, or common attribute can be displayed when the user touches an orb for a given patent reference.

Further, the user can interact with patent reference orbs. For example, the user can select a particular graphical object (e.g., an orb) within the 3D space. Once selected, certain predetermined information of the associated patent reference is displayed. For example, in response to the user's selection or touch of a graphical object, there can be displayed a title, inventor names, patent owner name, abstract, citations, financial value, examiner actions, and a representative drawing of the patent reference. In other embodiments, other attributes, characteristics, or parameters can be displayed.

In some embodiments, a user can define a volume or dimensions that are visible and/or navigable, such as when the user defines a spherical or rectangular graphical 3D environment. Additionally, the user can dynamically expand or contract the defined volume or dimensions. Further, the system can automatically download and display elements (e.g., patent reference orbs) that fall within the selected 3D volume. Since the user can define dimensionality of the 3D volume, this feature can be used by a user to indicate a specific 3D volume including items that are of concern to the user. Accordingly, this feature can help in detailed analysis or search of elements.

In yet additional embodiments, importance of elements can be tracked by the system and their visualization can be also dynamically changed. For example, when the elements are patent references, a changing level of importance can be calculated based on number of yearly citations, identification of renewal fees paid over the life of the patent, a number and details of licenses or assignments, identification of any blocking actions (e.g., patentability issues under 35 U.S.C. § 101 through 103), and the like. The importance can allow the user to see when a competitor's move into their "space" constitutes a more or less important threat.

In some embodiments, the elements, citations or other relationships can be mapped on top of a different 3D space. For example, a user can place certain orbs and/or selected attribute signposts in a lexical space, such that lines indicating, e.g., citations or co-authorships are generated and displayed in the 3D space. In other examples, a 3D space of patent references can be mapped or overlaid over a 3D space of products leading to the possibility of a joint visual analysis of technology and product strategy, for example, with virtual patent markers. This could help to understand what competitors a company has and where exactly they face market and technical competition.

In additional embodiments, users can engage into editing elements. For example, a user can make amendments to patent applications. The system allows tracking such amendments and visualizing them accordingly in the 3D space. This feature allows the user to amend the patent applications in real time in such a way that the user can visualize how an application reads on another patent reference.

Again, embodiments of this disclosure are focused on illustrating systems and methods of visual data mining using the example of patent literature, however the same technology can be effectively used to visualize any multi-dimensional data including any documents, non-patent literature, science papers, business-related data, commercial papers, and so forth.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein simply as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The embodiments of this disclosure are presented with reference to a system and methods for visual data mining. These system and methods are described in this section and illustrated in the accompanying drawings by various blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include cloud processing, microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

Moreover, it shall be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present.

The term "computing device" shall mean any electronic device with data processing capabilities. Some examples of computing device include, but not limited to, desktop computer, a laptop computer, a tablet computer, a workstation, a mobile device, acellular phone, a mobile phone, a smart phone, a personal digital assistant, a server, network device, a game console, a virtual reality device, a virtual reality headset, and so forth. The term "computing device" can also encompass a group or a network of computing devices.

The term "virtual reality" shall be construed to mean a computer-simulated environment that can simulate physical presence in places in the real world or imagined worlds. Virtual reality could recreate sensory experiences, including virtual, taste, sight, smell, sound, touch, and the like.

The term "Augmented Reality" shall be construed to mean a live direct or indirect view of a physical, real-world environment whose elements are augmented (or supplemented) by computer-generated sensory input such as video or graphics data.

The term "patent reference" shall be construed to mean any patent-related document, including, but not limited to, a granted patent publication, an individual claim, a patent application publication, an international application published under the Patent Cooperation Treaty, are issue patent publication, and so forth. Patent references can be issued by one state or country. Patent references can also relate to utility patents, design patents, plant patents, invention patents, utility model patents, industrial design patents, integrated circuit layout design patents, and so forth. In certain embodiments, the term "patent reference" can be also construed to mean a non-patent (technical) publication, including, for example, research papers, articles, theses, commercial papers, white papers, technical specifications, books, journals, and so forth. The terms "patent reference," "patent document," and "patent publication" can be used interchangeably.

The term "attribute" shall be construed to mean a particular characteristic or parameter of given patent reference. In certain embodiments, terms "attribute, "parameter," and "characteristic" can be used interchangeably. Some examples of attribute of a patent reference include, but not limited to, a keyword, a patent classification code, an inventor name, an assignee name, a patent owner name, backward citation, a forward citation, a count of backward citations, a count of forward citations, a country, an examiner's name, an agent's name, a filing date, a publication date, a priority date, an application number, a publication number, a number of blocking actions generated by the patent reference, a number of inventors, a level of difficulty in getting the patent reference granted, a period from a patent application filing date to patent issue date, a number of office actions received in the patent reference, a patent examiner name, a patent attorney name, a patent agent name, a patent firm name, an invalidation record, and an identification concerning payment of renewal patent fees.

II. System Architecture and Operation

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows a diagram illustrating a system environment suitable for practicing a method for visual data mining according to one embodiment. As shown in this figure, there is provided a computing device 105, such as a desktop computer, server, a smart phone, or a virtual reality device. Computing device 105 can include a virtual reality headset 110 or be connected to virtual reality headset 110. Virtual reality headset 110 can be a wearable display or head-mounted display configured to display images simulating a 3D virtual reality space or 3D augmented reality space. In other embodiments, virtual reality headset 110 can be substituted with a traditional display. In yet other embodiments, computing device 105 can be implemented as a virtual reality headset.

The headset 110 and/or other such devices may provide a virtual reality environment using various types of displays. For example, the virtual reality environment could be presented via a stereoscopic display or a holographic display that provides a 3D experience. Alternatively, a stereoscopic display or a single display may provide a virtual reality experience where the virtual environment expands beyond the instantaneous field of view provided to the user, but is not a true 3D display. For example, a headset may provide a 110 degree field of view to a 180 degree or 360 degree environment, such that the wearer can look around and perhaps move throughout the environment.

Additionally or alternatively, headset 110 and/or other such devices may facilitate an augmented-reality experience using various types of displays. For instance, an augmented-reality experience may be provided via video see-through display, by displaying real-time video from a point-of-view camera in the display, and overlaying computer-generated graphics on the point-of-view video. In other cases, an augmented-reality experience may be provided via an optical see-through display, which is at least partially transparent or translucent, so that the wearer can see their surrounding environment through the display. In such case, graphics may be displayed such that they appear to be part of the real-world surroundings that are visible through the display. In some cases, the computer-generated graphics may be "registered" to locations and/or orientations of real-world objects to enhance the perception that the virtual (i.e., graphical) objects and real-world surroundings are part of the same environment and/or to allow for simulated interaction of virtual and real-world objects with one another.

Computing device 105 further includes a processor 115, such as a central processing unit (CPU) and a memory 120. Memory 120 can store processor-readable instructions, which when implemented by processor 115, cause processor 115 to implement one or more implementations of a method for visual data mining as described herein.

In some embodiments, computing device 105 can also include one or more input devices, such as keypads, trackball, joysticks, controllers, touchpads, touchscreens, and the like to enable users of computing device 105 to interact with a 3D space displayed via virtual reality headset 110. For example, the user can manipulate the input devices to position, orient, move, or transfer with in the 3D space. The user can manipulate the input devices to point, select, or otherwise interact with graphical objects within the 3D space.

In both AR and VR arrangements, various types of hardware and/or software can facilitate user interaction. For example, input data from an accelerometer, a gyroscope, a magnetometer, proximity sensor(s), camera(s), eye or gaze tracking systems, microphone(s), touch pads, touchscreens, a keyboards, a mouse, a joystick, a trackpad, and/or other sensors and user input devices may be used to facilitate user interaction. As such, user interaction is possible via various modalities or combinations of modalities of input data, including but not limited to: hand gestures, head movement, touch gestures, button presses, slider movement, and voice commands, among other possibilities.

Computing device 105 be operatively connected with one or more patent databases 125 via a data network 130. Patent databases 125 can represent one or more servers storing electronic copies of patent references. Computing device 105 can communicate with patent databases 125 using application programming interface (API) codes or their analogues. In certain embodiments, patent databases 125 can be embedded in computing device 105.

Data network 140 refers to one or more wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, data network 130 includes a corporate network, datacenter network, service provider network, mobile operator network, or any combinations thereof.

In a further aspect, it should be understood that some or all functionality of a computing device 105 may be performed for and/or on behalf of computing device 105, via a "cloud" computing arrangement, without departing from the scope of the invention. For example, certain tasks or functions that involve intensive processing and/or coordination of communications with different systems and/or databases, may be performed for computing device 105 by a remote "cloud" server, which is better configured for such functionality. Other examples are also possible.

Figure 2:
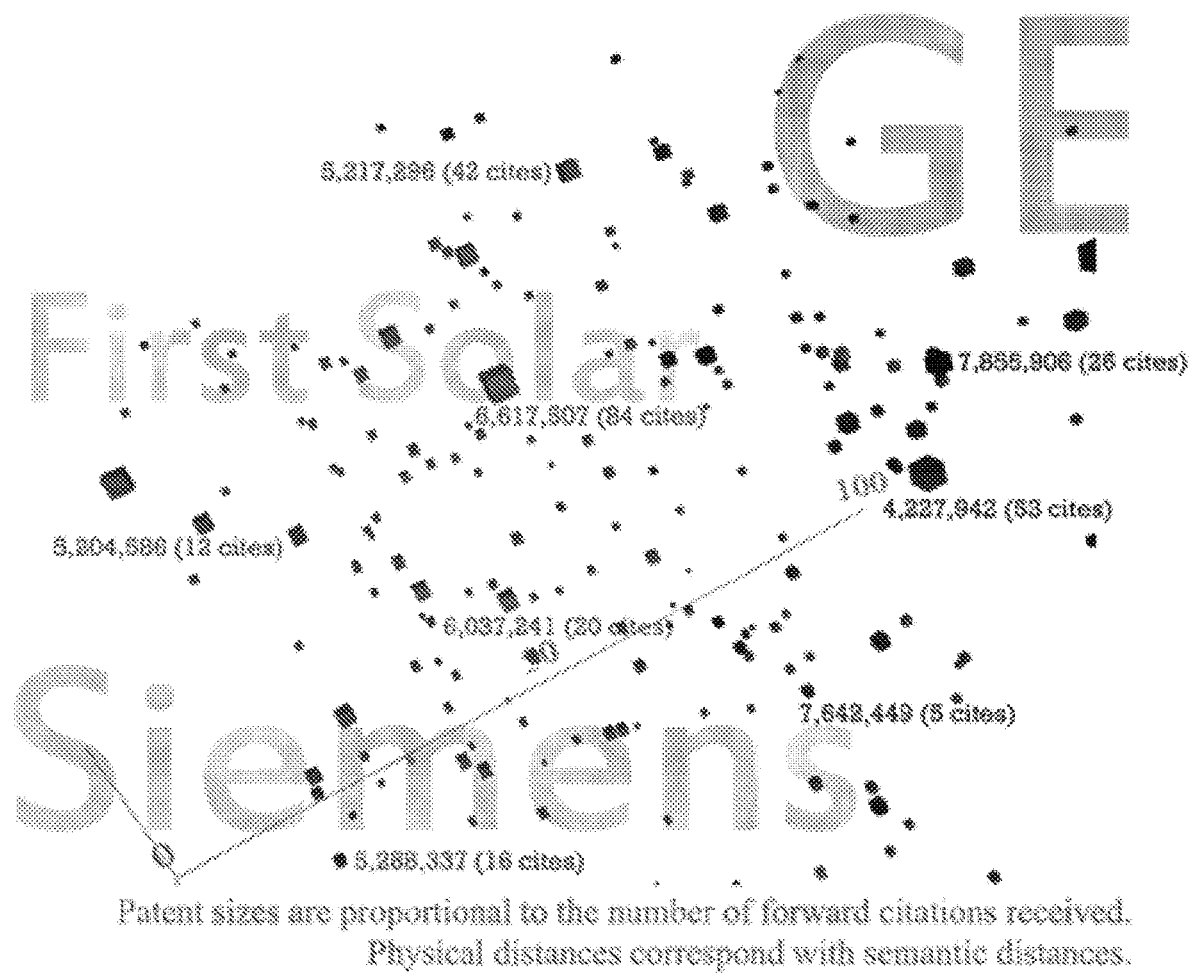
FIG. 2 shows a diagram illustrating an example image of 3D virtual reality space showing patent references according to one embodiment of a method for visual data mining.

FIG. 2 shows a diagram illustrating an example image of 3D virtual reality space showing patent references according to one embodiment of a method for visual data mining. As shown in this drawing, each cube is a graphical object representing one patent reference. A size or dimensions of the graphical object can depend on one of patent reference attributes. In the shown example, the size of cubes depend on a number (count) of forward citations given in a respective patent reference. One or more graphical objects can be provided with a written statement. For example, as shown in FIG. 2, one or more graphical objects can be supplemented with a patent number and a number of forward citations. Furthermore, a color of graphical element can be selected based on another patent reference attribute such as an assignee, applicant, or patent owner. Thus, patent references can be grouped by colors such that they can be easily differentiated by users. Moreover, groups of patent references can be located or clustered in an area of the 3D space related to a given attribute (such groups located near one another due to subject-matter similarities may be conceptualized as "neighborhoods" or "clouds" of topically-related references). Each neighborhood or cloud can be supplemented with a title of the common attribute, such as patentee name (e.g., "GE" "First Solar" or "Siemens" as shown in FIG. 2), or key term that the references are relevant to.

Furthermore, physical distances between the graphical objects can correspond to yet another attribute, parameter or characteristic of patent reference. In the shown example, the physical distances between graphical references can be calculated as semantic distances. In other embodiments, however, other parameters or attributes can be used to calculate distances.

As discussed above, the users can navigate through the virtual space of FIG. 2. The users can move from one coordinate location to another coordinate location. The user can touch, select, or activate orbs or graphical objects. Moreover, in certain embodiments, the users can select a threshold distance value, and computing device 105 will display only those patent references that occur within that threshold distance value.

In some embodiments, changes over time and time sequences may also be included. For example, a patent orb can get bigger on the date when it is cited, shrink when it is not cited for a particular length of time, etc. or when a new patent is granted, as it appears at each point in time.

III. Exemplary Methods

Figure 3:
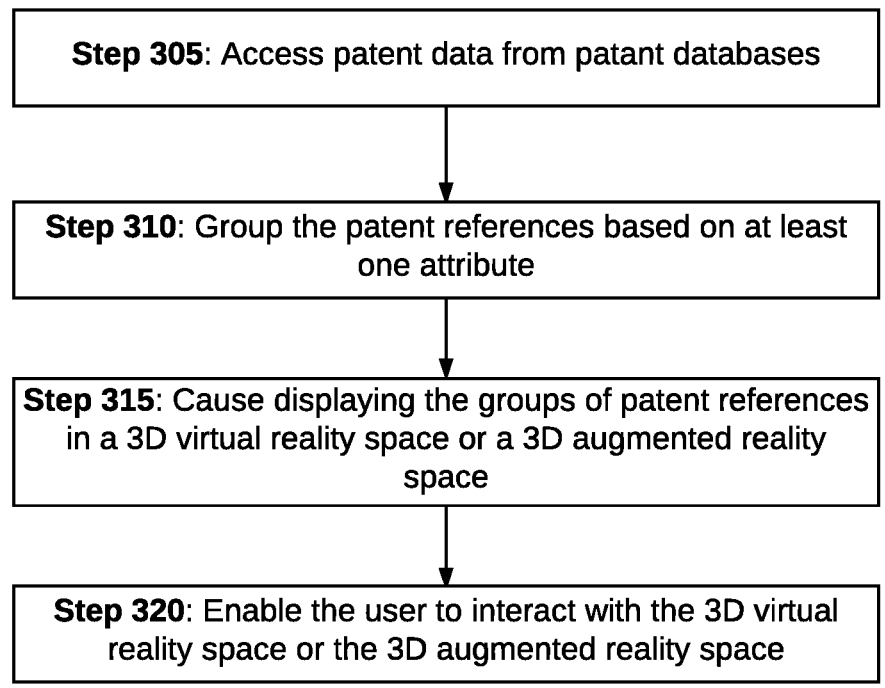
FIG. 3 shows a block diagram illustrating one example method for visual data mining.

FIG. 3 is a process flow diagram showing a method 300 for visual datamining according to an example embodiment. Method 300 may be performed by processing logic that may comprise hardware (e.g., decision-making logic, dedicated logic, programmable logic, and microcode), software (such as software run on a general purpose computer system or a dedicated machine), or a combination of both. In one example embodiment, the processing logic refers to computing device 105 of FIG. 1. Below recited operations of method 300 may be implemented in an order different than described and shown in the figure. Moreover, method 300 lay have additional operations not shown herein, but which can be evident for those skilled in the art from the present disclosure. Method 300 may also have fewer operations than outlined below and showman FIG. 3.

Method 300 commences at operation 305 when computing device 105 accesses patent data at one or more patent databases 125. The patent data includes a plurality of patent references. Computing device 105 can download at least certain portions of one or more patent references from patent databases 125. In operation 305, the patent references can be accessed based on a user input or command. For example, the patent references can be accessed in response to a user's command (or search query), which defines one or more attributes.

At operation 310, computing device 105 groups the patent references based on at least one attribute. Accordingly, one or more groups of the patent references are created. This operation can be performed automatically when computing device 105 generates a 3D space of the patent references collected based on certain attributes.

At operation 315, computing device 105 generates a 3D virtual reality space or a 3D augmented reality space and causes displaying the groups of patent references within the 3D virtual reality space or 3D augmented reality space (collectively referred to as a "3D space"). As discussed above, each of the patent references can be represented by a graphical object within the 3D space. Furthermore, each of the groups of patent references can be displayed by a virtual orb. At least one graphical characteristic of each virtual orb can be based on at least one attribute of respective patent reference. For example, the graphical characteristic can be a color, a size (dimensions), a shape, written title, and so forth.

The generation of a 3D space can also involve the calculation of distances between each pair of the patent references based on at least one parameter or attribute. When distances are calculated, computing device 105 can display at least some of the patent references in the 3D space such that these patent references are separated by the calculated distances.

In certain embodiments, the distances can be calculated by generating vectors for each of the patent references based on a frequency of at least one parameter or attribute of the patent reference. For example, a vector can be generated for each patent reference based on a frequency of certain or all keywords present in the patent reference. More specifically, for a corpus of text documents (e.g., patent references), computing device 105 can vectorize each document and combine the vectors to obtain a matrix X of dimension m×n for the group, where m is a number of patent references and n is a number of different attributes (e.g., different key terms). Further, computing device 105 can reduce a dimensionality of the vectors for each of the patent references. This operation can be performed by Principal Component Analysis (PCA) or another similar technique against the matrix X for the group of patent references. As a result, computing device 105 obtains 1-PC (Principal Component), 2-PC, and 3-PC, which are used to render the visual representation of a patent reference in the 3D space.

At operation 320, computing device 105 enables the user to interact with the 3D virtual reality space or the 3D augmented reality space. For example, computing device 105 can receive a user selection of one of the virtual orbs, and in response thereto, computing device 105 can display at least one attribute of the selected virtual orb. The interaction may also enable the user to orient and change a position and even "fly" within the 3D space. The user can also select at least one of the virtual orbs. When at least one of the virtual orbs is selected, computing device 105 can display some predetermined information of the selected orb. In additional embodiments, the user can also select at least one of the graphical objects. When at least one of the graphical objects is selected, computing device 105 can display some predetermined information of the selected patent reference, such as title, drawings, full text, names, and the like.

Figure 4:
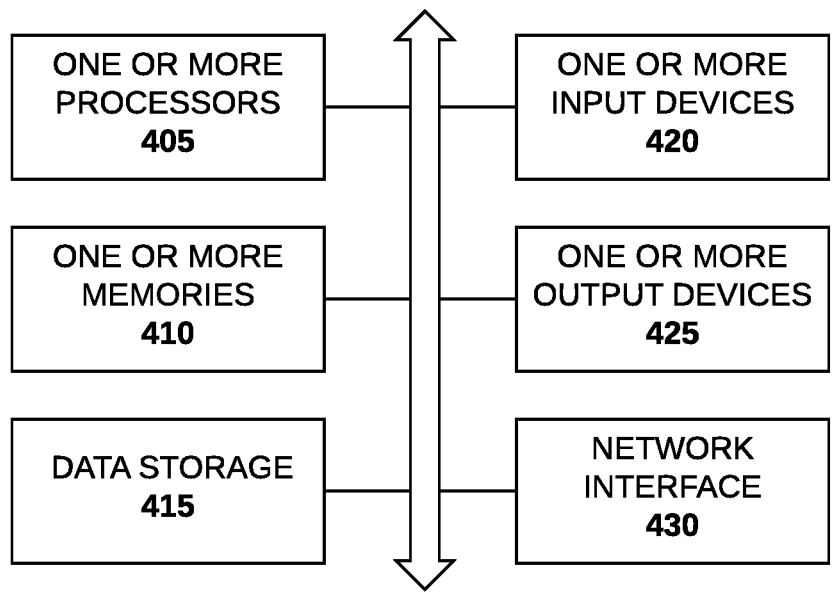
FIG. 4 shows a block diagram illustrating an example computer system that may be used to implement the method for visual data mining.
Figure 5:
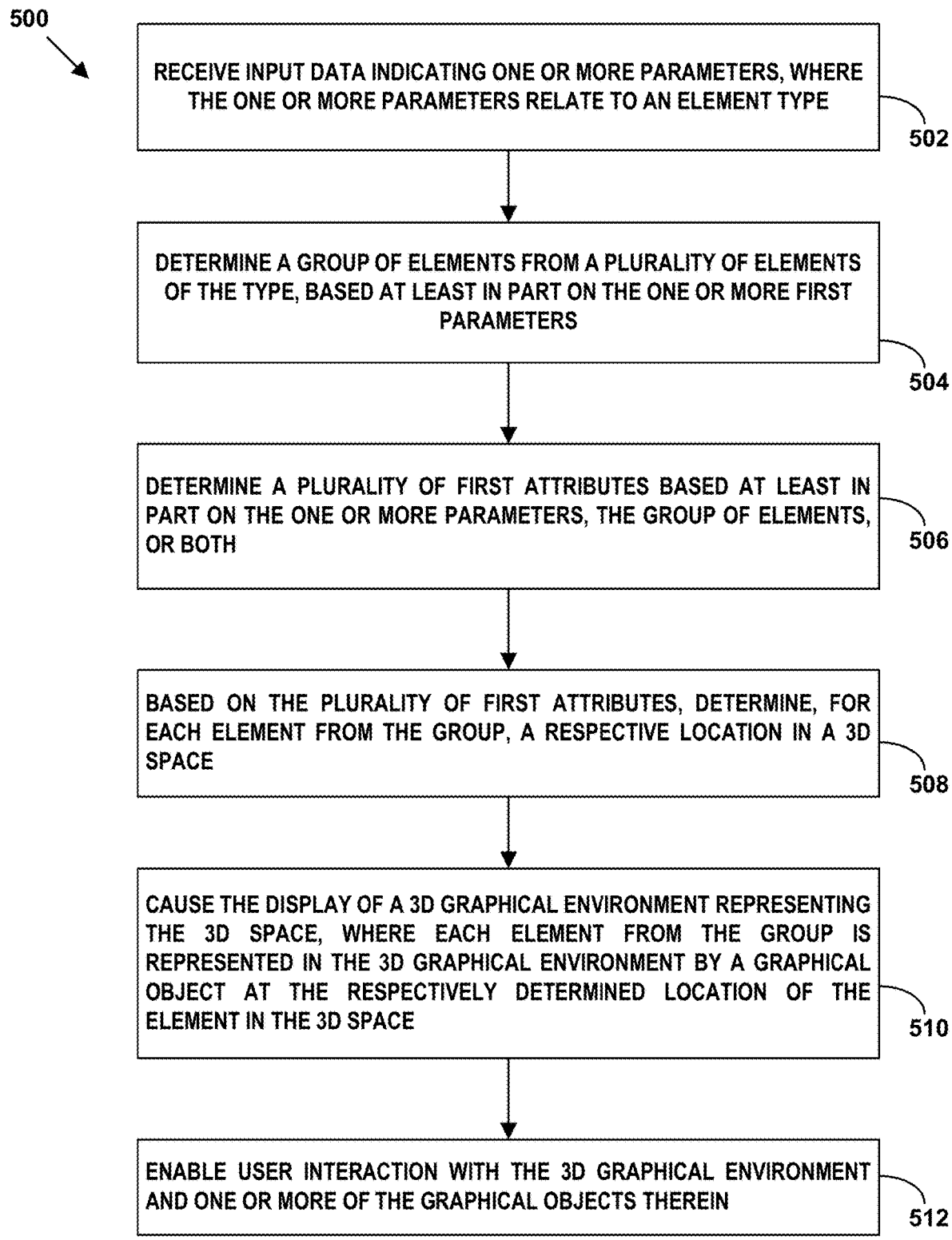
FIG. 5 is a flow chart illustrating another method, according to example embodiments.

FIG. 4 shows a block diagram illustrating an example computer system that may be used to implement the method for visual data mining. In one example embodiment, computer system is an instance of computing device 105. As shown in FIG. 5, computer system includes one or more processors 405, one or more memories 410, one or more data storage devices 415, one or more input devices 420, one or more output devices 425, and network interface 430. One or more processors 405 are, in some examples, configured to implement functionality and/or process instructions for execution within computer system 400. For example, processors 405 may process instructions stored in memory 410 and/or instructions stored on storage devices 415. Such instructions may include components of an operating system or software applications.

Memory 410, according to one example, is configured to store information within computer system 400 during operation. Memory 410, in some example embodiments, may refer to a non-transitory computer-readable storage medium or computer-readable storage device. In some examples, memory 410 is a temporary memory, meaning that a primary purpose of memory 410 may not be long-term storage. Memory 410 may also refer to a volatile memory, meaning that memory 410 does not maintain stored contents when memory 410 is not receiving power. Examples of volatile memories include random access memories (RAM), dynamic random access memories (DRAM), static random access memories (SRAM), and other forms of volatile memories known in the art. In some examples, memory 410 is used to store program instructions for execution by processors 405. Memory 410, in one example, is used by software.

One or more storage devices 415 can also include one or more transitory or non-transitory computer-readable storage media and/or computer-readable storage devices. In some embodiments, storage devices 415 may be configured to store greater amounts of information than memory 410. Storage devices 415 may further be configured for long-term storage of information such as patent data. In some examples, the storage devices 415 include non-volatile storage elements. Examples of such nonvolatile storage elements include magnetic hard discs, optical discs, solid-state discs, flash memories, forms of electrically programmable memories (EPROM) or electrically erasable and programmable memories, and other forms of non-volatile memories known in the art.

Computer system 400 may also include one or more input devices 420. Input devices 420 may be configured to receive input from a user through tactile, audio, video, or biometric channels. Examples of input devices 420 may include a keyboard, keypad, mouse, trackball, touchscreen, touchpad, microphone, one or more video cameras, image sensors, fingerprint sensors, or any other device capable of detecting an input from a user or other source, and relaying the input to computer system 400 or components thereof. Additional examples of input devices 420 include depth sensors, remote sensors, and so forth.

Output devices 425, in some examples, may be configured to provide output to a user through visual or auditory channels. Output devices 425 may include a video graphics adapter card, a liquid crystal display (LCD) monitor, a light emitting diode (LED) monitor, an organic LED monitor, a virtual reality headset, a virtual reality display, a sound card, a speaker, a lighting device, a LED, a projector, or any other device capable of generating output that may be intelligible to a user. Output devices 425 may also include a touchscreen, presence-sensitive display, or other input/output capable displays known in the art.

Computer system 400, in some example embodiments, also includes network interface 430. Network interface 430 can be utilized to communicate with external devices (e.g., patent databases) via one or more networks such as one or more wired, wireless, or optical networks including, for example, the Internet, intranet, LAN, WAN, cellular phone networks (e.g. GSM communications network, packet switching communications network, circuit switching communications network), Bluetooth radio, and an IEEE 802.11-based radio frequency network, among others. Network interface 430 may be a network interface card, such as an Ethernet card, an optical transceiver, a radio frequency transceiver, or any other type of device that can send and receive information. Other examples of such network interfaces may include Bluetooth®, 3G, 4G, the forthcoming 5G, LTE, and Wi-Fi radios in mobile computing devices.

FIG. 5 is a flow chart illustrating another method 500, according to example embodiments.

As shown by block 502, method 500 involves a computing device receiving input data indicating one or more parameters, where the one or more parameters relate to an element type. The computing device may have direct or indirect access to a database of multidimensional data that includes a plurality of elements of the element type, such that the parameters can be used to search the multidimensional data and locate elements relating to the one or more parameters. As such, the computing device can then determine a group of elements from the plurality of elements, based at least in part on the one or more first parameters, as shown by block 504. The computing device also determines a plurality of first attributes (e.g., key terms) based at least in part on the one or more parameters, the group of elements, or both, as shown by block 506. Then, based on the first attributes, the computing device determines, for each element from the group, a respective location in a 3D space, as shown by block 508.

The computing device can then proceed to provide a virtual reality and/or augmented reality environment via which a user can navigate and interact with the group of elements in an intuitive manner. More specifically, the computing device causes the display (e.g., on a graphic display device of the computing device itself or another computing device) of a 3D graphical environment representing the 3D space, where each element from the group is represented in the 3D graphical environment by a graphical object at the respectively determined location of the element in the 3D space, as shown by block 510. (It should be understood that not all of the graphical objects are necessarily visible at any given point in time, since the visible objects may depend on the user's location within the environment and/or the user's field of view in the environment.) Further, the computing device may enable user interaction with the 3D graphical environment and one or more of the graphical objects therein, as shown by block 512.

Aspects of method 500 will now be described in greater detail with reference where appropriate to FIGS. 6A to 6D and FIGS. 7A to 7E. FIGS. 6A to 6D are illustrations of user's field of view of another exemplary 3D graphical environment 600 for navigation of patent documents, as the user's field of view changes over time. FIGS. 7A to 7E are also illustrations of user's field of view of yet another exemplary 3D graphical environment 700 for navigation of patent-document objects, as the user's field of view changes over time.

Determining the Group of Elements for the 3D Space

At block 502 of method 500, the group of elements is determined by one or more parameters that are specified by the user. For example, in the context of patent documents, the user may specify a patent owner (or possibly multiple patent owners), or a key term such as a technology space (e.g., "autonomous vehicles"), a patent application, an individual claim, a synonym expansion of supplied terms, or all of these. The computing device may then perform a search of a patent database and determine a group of patent documents matching the parameter(s).

Figure 6A:
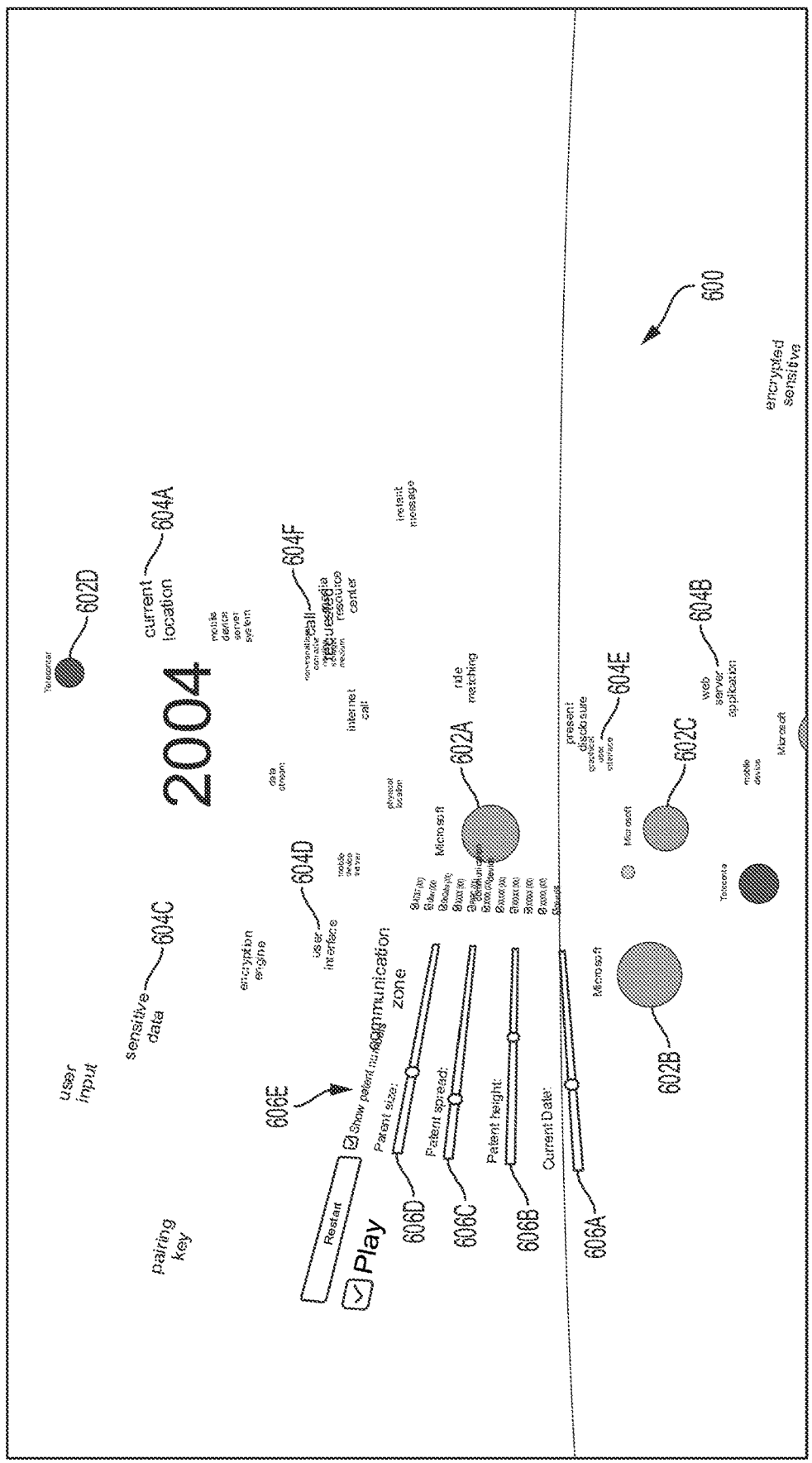
FIGS. 6A to 6D are simplified illustrations of a 3D graphical environment provided in accordance with example embodiments.
Figure 6B:
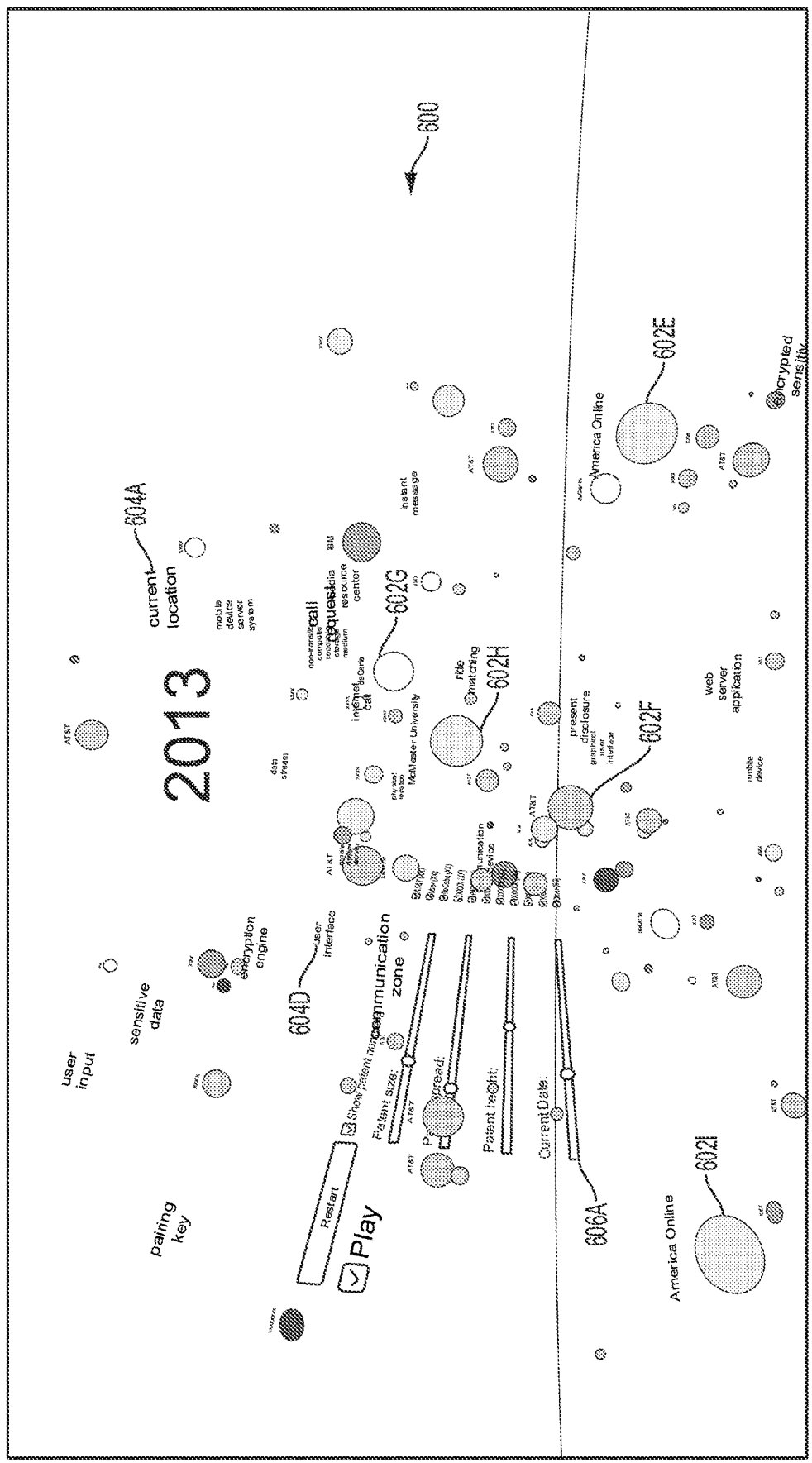
Figure 6C:
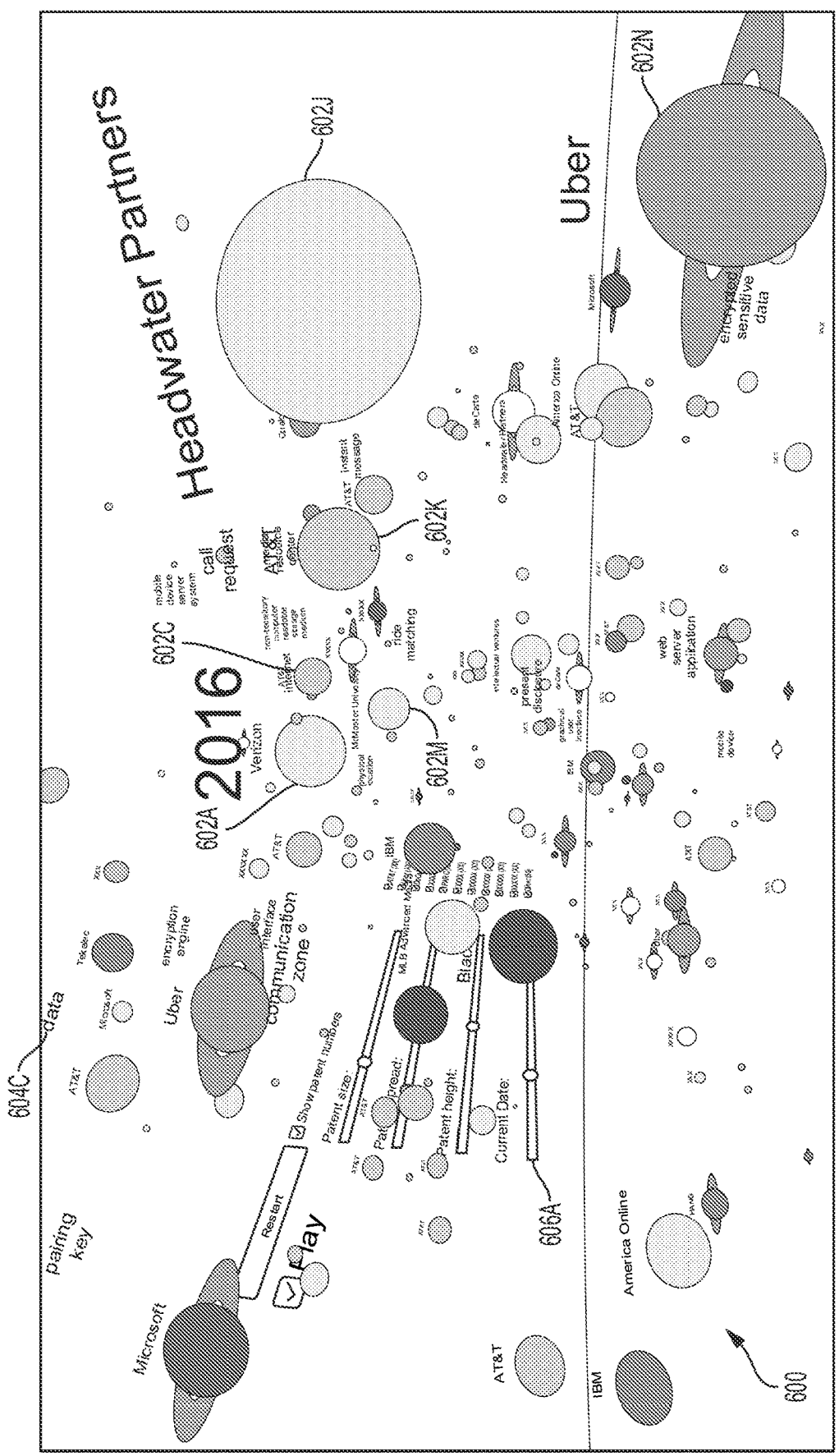
Figure 6D:
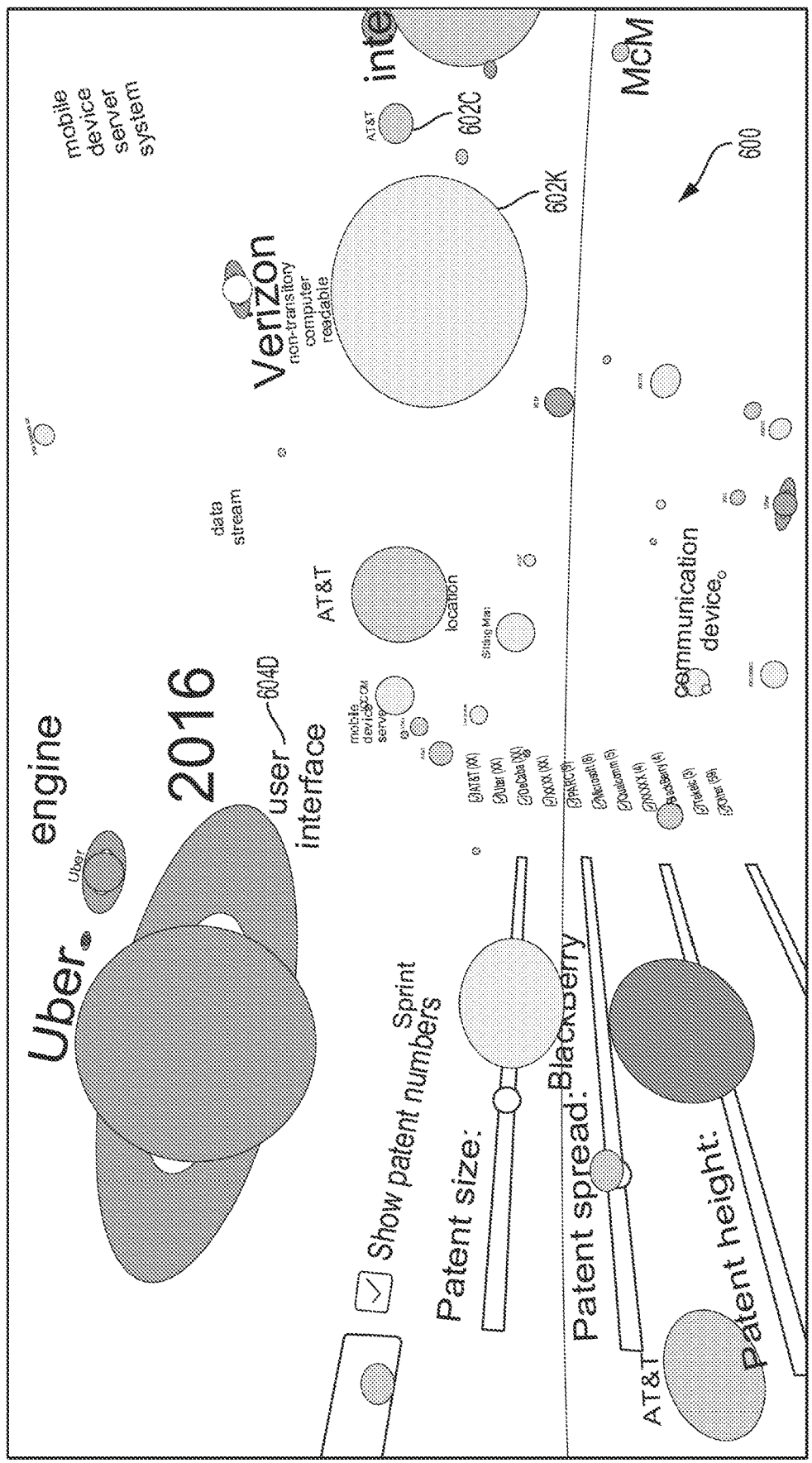

To provide a specific example, consider the scenario illustrated in FIG. 6A. Specifically, FIG. 6A shows a scenario where the user has set a patent owner (or assignee) parameter to "Uber" such that the group of patent documents for the 3D space includes patent documents assigned to the entity named "Uber."

In a further aspect, one or more matched patent documents, owned or assigned to other entities, may also be included in the group for the 3D space. The matched patent documents may be determined based on a similarity (e.g., in technology area(s)) of the matched patent documents to the patent documents owned by the user-specified patent owner (e.g., "Uber"). For instance, the matched patent documents could be determined based on one or more additional parameters specified by the user, such as a key term, key terms, key phrases, synonym expansions of terms and/or phrases, or classification classes, relating to a technology area. Additionally or alternatively, the computing device may automatically determine the matched patent documents; e.g., by determining one or more key terms or key concepts that appear frequently in the patent documents assigned to the user-specified patent owner, and identifying a set of matched patents that are relevant (and preferably most relevant) to those key terms or concepts. Additionally or alternatively, a user may input a set of entities, based on strategic or analysis considerations.

The user may have also specified a date parameter, which is used to determine the group of patents for the 3D space. For instance, in FIG. 6A the user may have set a date parameter for the 3D space to "2003." Alternatively, the computing device may have set the date parameter without any explicit input from the user. In either case, the group of patents for the 3D space represented in FIG. 6A is determined based on the date parameter and the patent owner parameter, such that the 3D environment 600 includes graphic representations (e.g., orbs 602A-602M) of patent documents assigned to Uber and in existence in 2003 (note that Uber may not have owned the documents until later, so long as the patent document existed in 2003), as well as matched patent documents assigned to other entities and in existence in 2003.

Figure 7A:
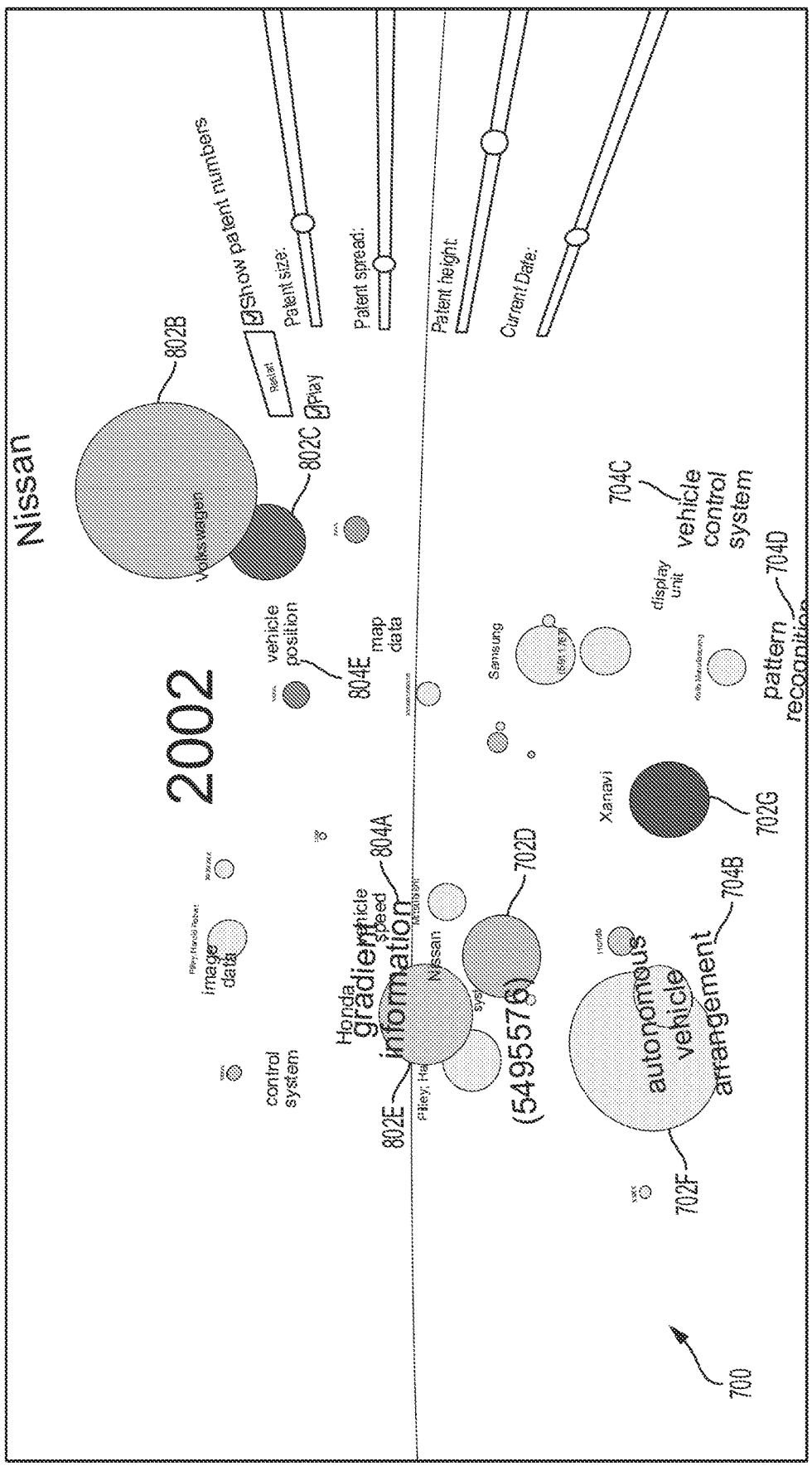
FIGS. 7A to 7E are simplified illustrations of another 3D graphical environment provided in accordance with example embodiments.
Figure 7B:
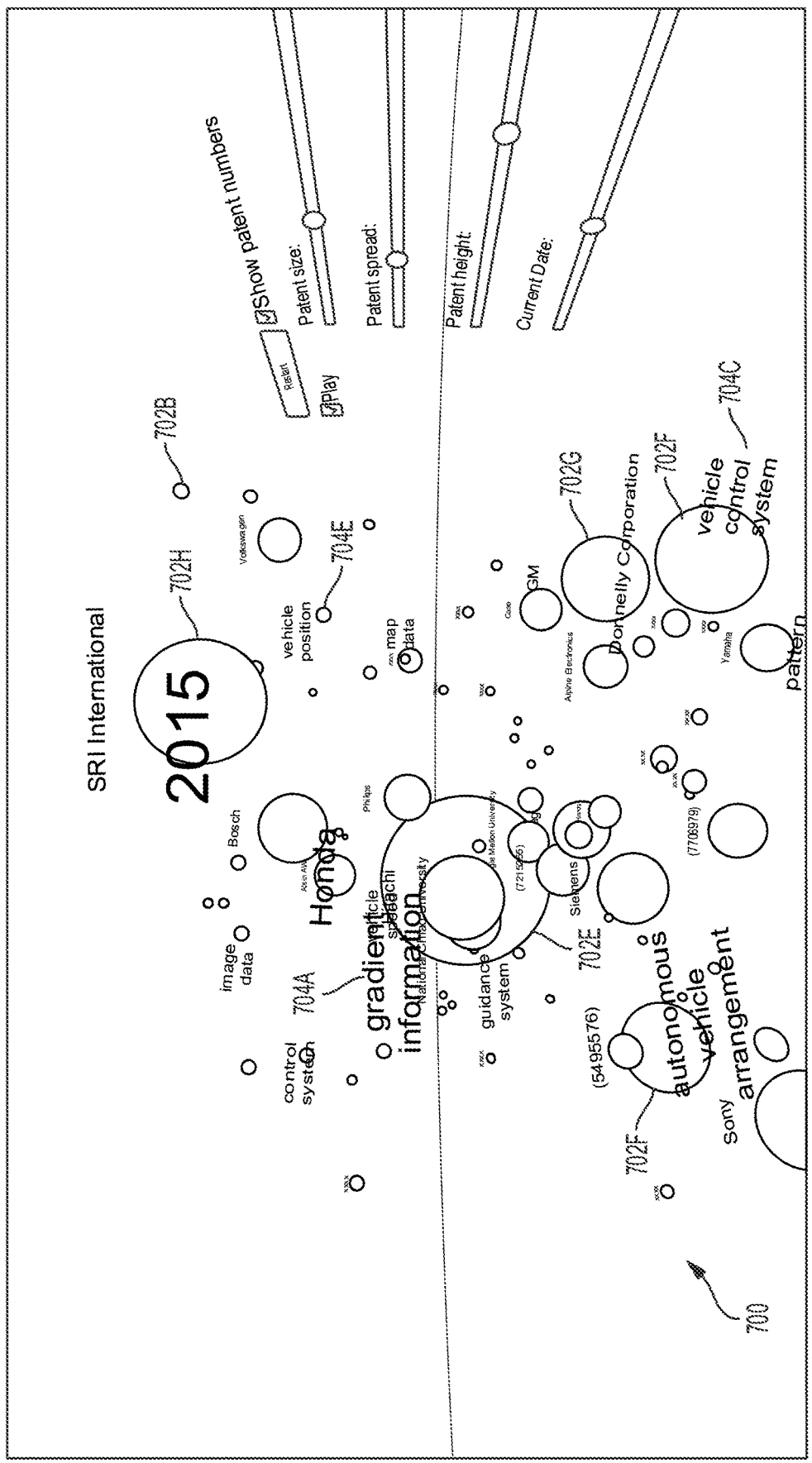
Figure 7C:
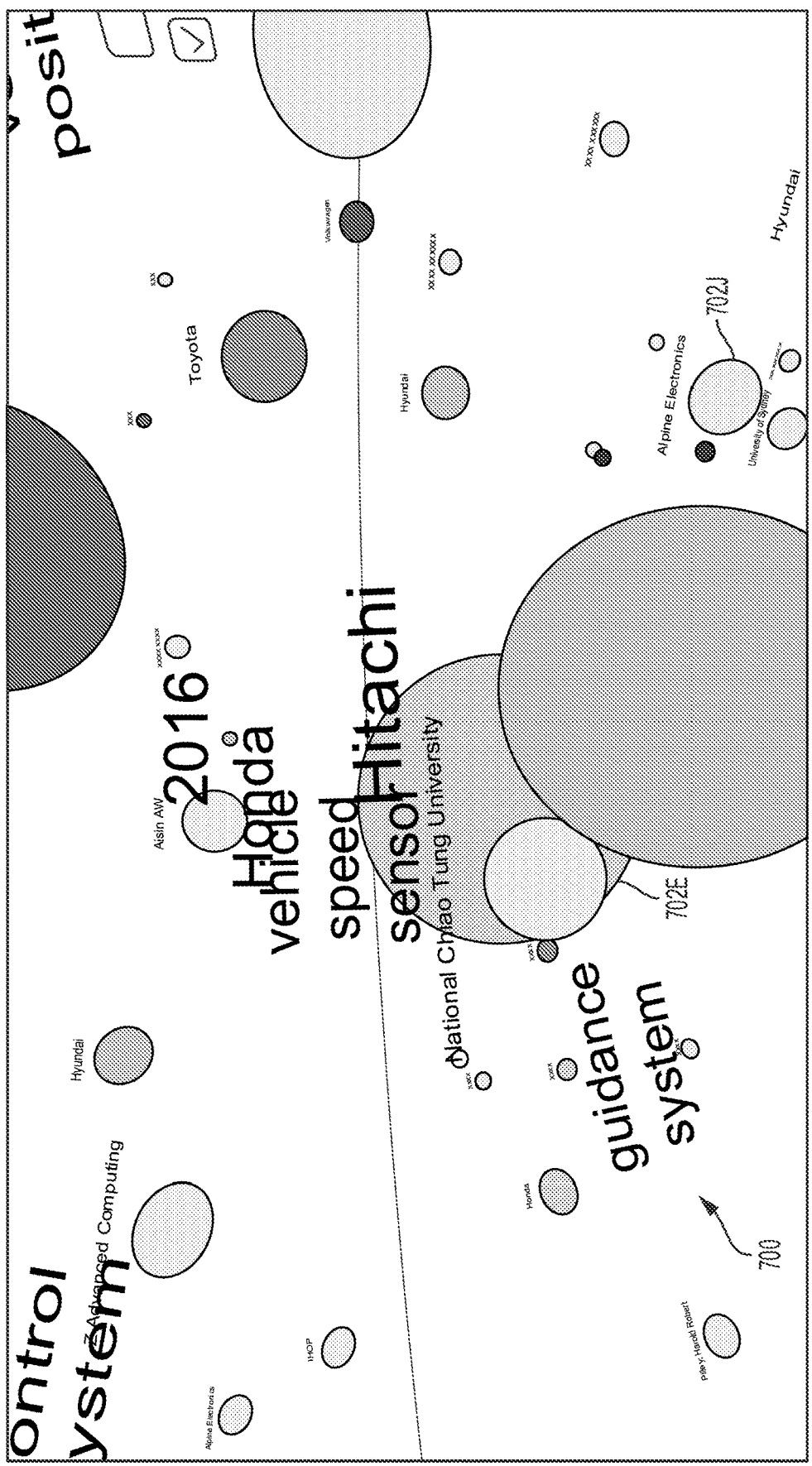
Figure 7D:
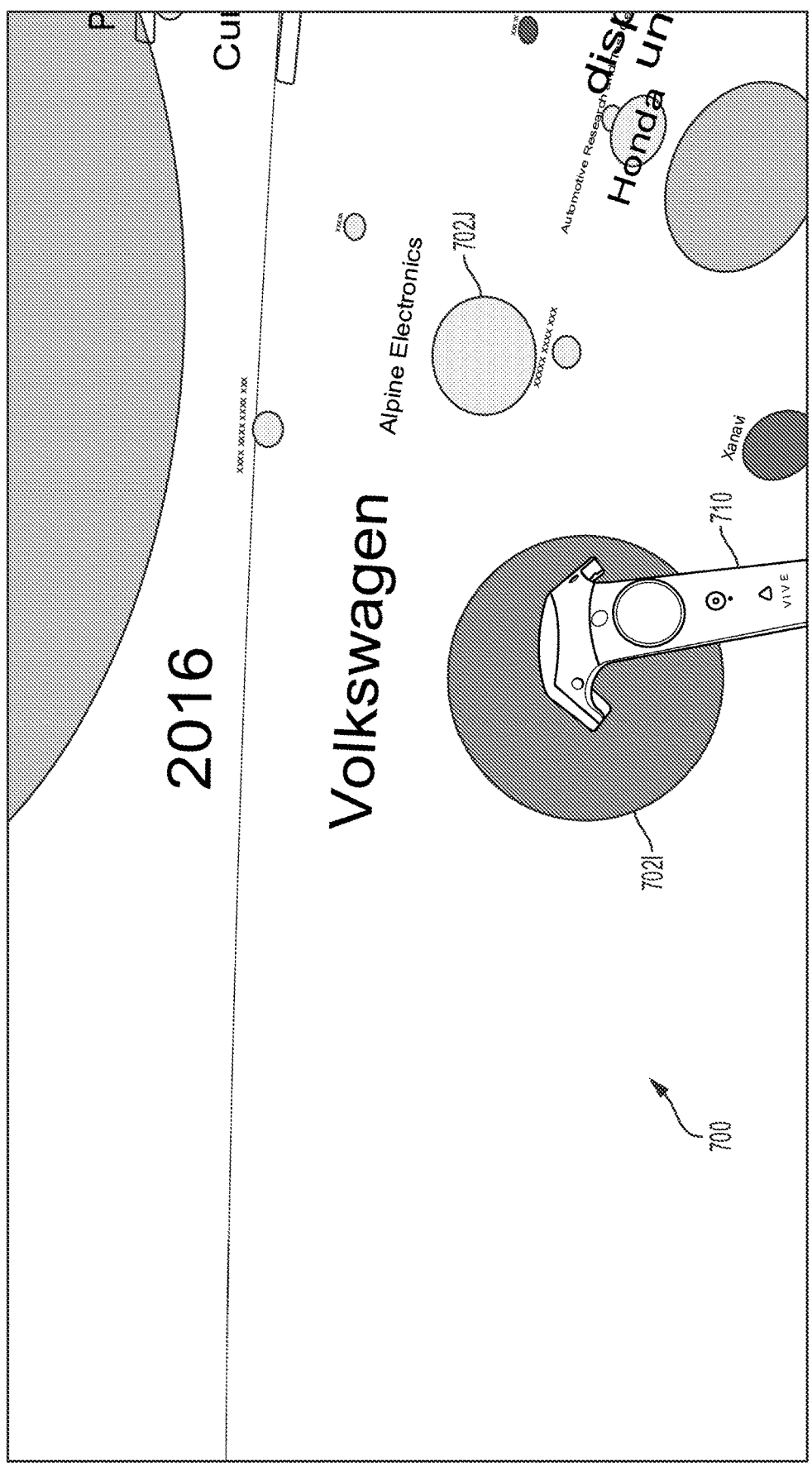
Figure 7E:
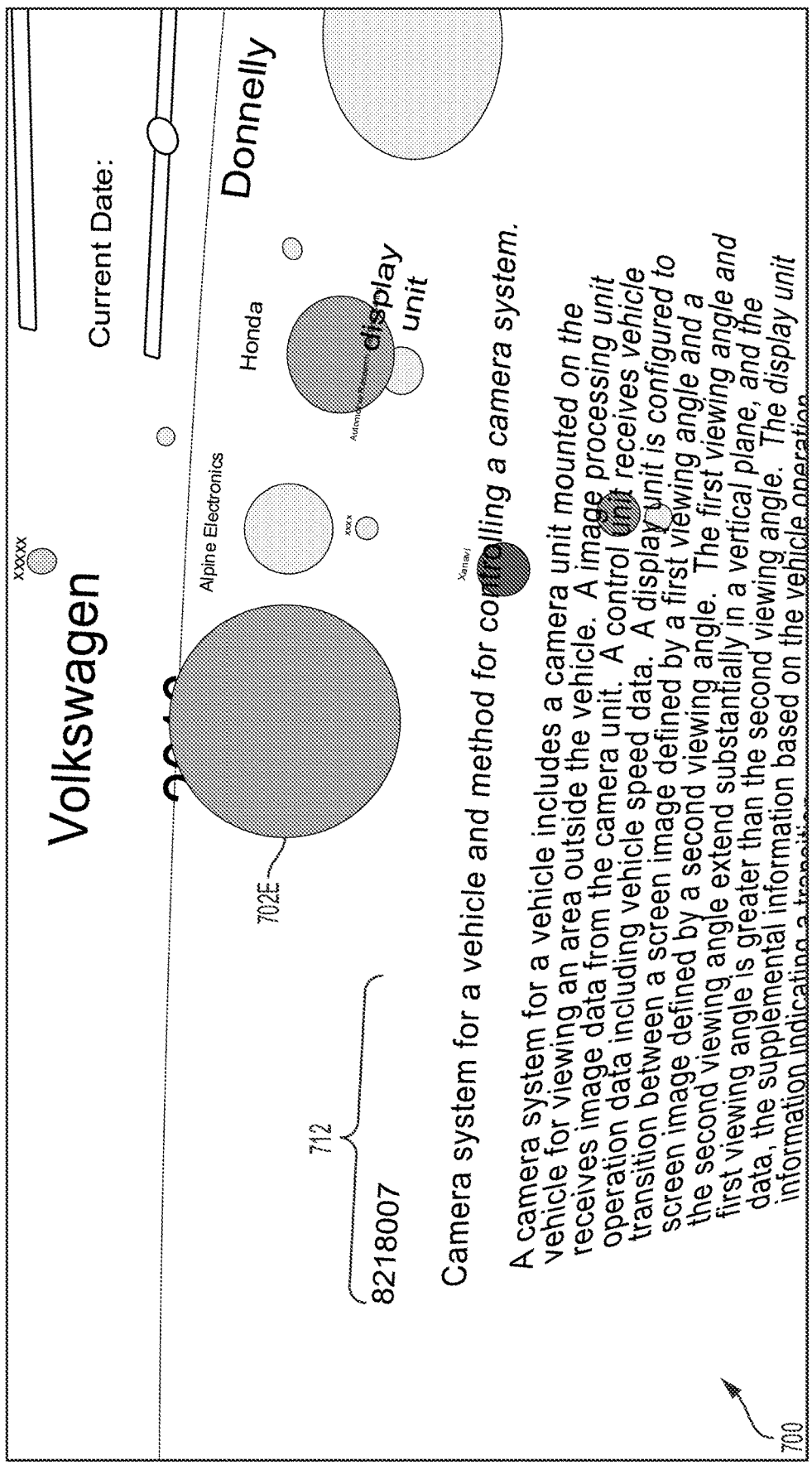

FIG. 7A is an illustration of another 3D graphical environment, according to example embodiments. FIG. 7A shows a scenario where the user has set a technology space parameter to "autonomous vehicle," such that the group of patent documents for the 3D space includes patent documents relevant in this technology space. The user may have also specified a date parameter, which is used to determine the group of patents for the 3D space represented in FIG. 7A. For instance, in FIG. 7A the user may have set a date parameter for the 3D space to "2004." Alternatively, the computing device may have set the date parameter without any explicit input from the user. In either case, the group of patents for the 3D space represented in the 3D environment of FIG. 7A is determined based at least in part on the date parameter and the technology space parameter, such that the 3D environment 700 includes graphic representations (orbs 702A-702F) of patent documents in existence in 2004 and relevant to "autonomous vehicle" technology.

It should be understood that the example parameters used to generate the groups of patent documents for FIGS. 6A and 7A are not intended to be limiting. Other parameters, or combination of parameters, may also be used to select a group of patent documents (or a group of another type of element). For example, in the context of patent documents, the parameters utilized at block 504 may include one or more of the following parameters: a keyword, a patent classification code (USPC, CPC, IPC, Japanese F terms, industrial NAICS), an inventor name, an assignee name, a patent owner name, a backward citation, a forward citation, a count of backward citations, a count of forward citations, a country, an examiner's name, an agent's name, a filing date, a publication date, a priority date, an application number, a publication number, a number of blocking actions generated by the patent reference, a number of inventors, a level of difficulty in getting the patent reference granted, a period from a patent application filing date to a patent issue date, a number of office actions received in the patent reference, a patent examiner name, a patent attorney name, a patent agent name, a patent firm name, an invalidation record, and/or an identification concerning payment of renewal patent fees.

Further, it should be understood that the claimed invention is not limited to patent references. As such, the examples, provided herein could be applied to provide for visualization of and interaction with elements of other types.

For instance, exemplary methods could be applied for elements such as virtual patent markings, product descriptions, scholarly articles, and so on. Further, the group of elements could include elements that each represent a single patent claim, or that each represent some other portion of a patent or another type of document, such as, for example, an abstract. Other types of elements are also possible. Yet further, example methods may be implemented for element groups that include two or more different types of elements; for instance, patent references, scholarly articles related to a particular technological field, and virtual patents markers, among other possibilities.

Determining the First Attributes for the Elements in the 3D Space

Referring back to FIG. 5, block 506 involves the computing device determining a plurality of first attributes based at least in part on the one or more parameters, the group of elements, or both. For example, in the context of a 3D environment for exploring patent documents, the first attributes may be a set of key terms that relate to an owner/assignee, a technology space, and/or a timeframe indicated by the parameters for the group of patents that is being visualized. Other examples are of course possible.

To illustrate a specific example, consider again the parameters used to generate the 3D environment 600 shown in FIGS. 6A to 6D. In FIG. 6A, the patent owner parameter is set to "Uber" and a time parameter is set to "2003", such that the group of patent documents for the 3D space includes patent documents in existence and enforceable in 2003, which are either assigned to the entity named "Uber" or matched documents owned by another entity. Based on the patent-owner parameter being set to "Uber," the computing device may determine a number of key terms relating to the patent documents owned by Uber. In this example, the key terms include, but are not limited to: "current location", "web server application", "sensitive data", "call request", "user interface", "graphical user interface", and "encryption engine", among other possibilities.

In the above example, the attributes (e.g., key terms) could be determined at block 506 based on the patent owner parameter (and perhaps other parameter(s) as well). For instance, "curated" lists of key terms relevant to the technologies of various patent owners could be maintained in a database, such that the key term(s) for a particular patent owner (e.g., "Uber") can be retrieved upon receiving input data identifying the particular patent owner via the patent-owner parameter. Further, the attributes (e.g., key terms) could be determined at block 506 based on a combination of the patent owner attribute and the determined group of patents (and/or other parameters). For example, a set of key terms for a 3D space showing patents for a particular patent owner could be a combination of a predetermined or curated list of key terms for the patent owner (or a portion of such a predetermined list) and dynamically determined key terms based on the group of patents and/or other documents relevant to the patent owner (e.g., news or scholarly articles related to the patent owner).

Additionally or alternatively, the attributes (e.g., key terms) could be determined at block 506 based on the group of patents that was determined at block 504 (or a subset thereof). For instance, once the computing device identifies the group of patents owned by a specified patent owner, the computing device could analyze the group and determine the most frequently occurring terms in the group of patents, or could determine important terms across the group of commonly-owned patents using other techniques. The determined set of key terms can then be used as the attributes for generating the 3D space (and locating patent-reference objects therein).

FIGS. 7A to 7E provide another specific example where the attributes determined at block 506 are a set of key terms. In particular, FIG. 7A shows a scenario where the user has set a technology-space parameter to "autonomous vehicle." In this scenario, block 506 could involve determining key terms relating to technology sub-spaces within the larger technology space of autonomous vehicles. In example illustrated by FIGS. 7A to 7E, the key terms include, but are not limited to: "gradient information", "autonomous vehicle arrangement", "vehicle control system", "pattern recognition", and "vehicle position", among other possibilities.

In the example relating to FIG. 7A, the attributes (e.g., key terms) could be determined at block 506 based on the technology-space attribute. For instance, curated lists of key terms relevant to various technology spaces or areas could be maintained in a database, such that the key term(s) for a particular technology space (e.g., "autonomous cars") can be retrieved upon receiving input data identifying the particular technology space via the technology-space parameter. Further, the attributes (e.g., key terms) could be determined at block 506 based on a combination of the technology-space attribute and the determined group of patents (and/or other parameters).

In some implementations of method 500, when a user specifies a particular technology space for visualization in a 3D space, block 506 might be performed to determine attributes, before some or all of the group of patents are determined at block 504. More specifically, the key terms for the specified technology space may be determined, and then used to identify the group of patents (or a portion of the group) for the 3D space. In such implementations, block 504 could involve using some or all of the key terms for the technology space to search a patent database. Such a search may determine the group of patents for the 3D space by identifying patents where one or more of the key terms occur most frequently, or by using other search criteria related to the key terms for the technology space.

In a further aspect of some embodiments, a user could specify both a patent-owner parameter and a technology space parameter (and perhaps other parameters as well). Accordingly, block 502 may involve receiving these parameters in input data. Such embodiments may provide for 3D visualization and virtual- or augmented-reality interaction with of a particular entity's patent documents in a particular technology space. This may be useful when, e.g., a company has diverse products that span different and possibly unrelated technology spaces.

Determining Locations for Elements in a 3D Space

Referring again to FIG. 5, block 508 of method 500 involves the computing device determining the respective location in the 3D space for each element from the group of elements determined at block 504. In example embodiments, the locations of the elements in the 3D space can be determined based at least in part based on the attributes determined at block 506 of method 500.

In example embodiments, the location of each element in the 3D space may be given by a vector that provides coordinates (e.g., x, y, and z coordinates) for the element. The vector for a given element can be determined based in part on a frequency of one or more attributes (e.g., one or more key terms) in each element; e.g., by using PCA analysis to generate a respective three-component vector for the element. When the plurality of attributes comprises four or more attributes (e.g., four or more key terms), use of PCA analysis reduces a multidimensional matrix for each element down to a three-component vector (e.g., 1-PC, 2-PC, and 3-PC), such that the element can be located in a 3D space.

More specifically, for a group of elements m (e.g., patent references), the computing device 105 can generate an n-dimensional vector for each element in the group, n is the number of attributes that are generated for the group in accordance with example embodiments. Where each attribute is a key term and the elements are patent references, n is the number of key terms, and the n-dimensional vector for a given patent reference may indicate, across all key terms, the respective frequency with which each key term occurs in the given patent reference (or some other metric indicating the relevancy of the given patent reference). These n-dimensional vectors may then be used to generate a matrix X having dimensions m×n, where m is the number of elements (e.g., patent references) in the group. PCA can then be applied to the matrix X for the group of elements to reduce the n-dimensional vector for each element to a three-dimensional vector indicating the three principal components (1-PC, 2-PC, and 3-PC) for each element (e.g., each patent reference). The three principal components for a given patent reference indicate the location of the reference in the 3D space, and can thus be used to render the graphic representation of the reference in a 3D augmented- or virtual-reality environment. Other techniques for determining element locations in the 3D space are also possible.

When PCA is applied to an m×n matrix for a group having m patent references, the first three principal components 1-PC, 2-PC, and 3-PC, will indicate coordinates in a 3D space defined by axes corresponding to 1-PC, 2-PC, and 3-PC. 1-PC, 2-PC, and 3-PC are unitless and don't necessarily correspond to any particular attribute, but instead indicate dimensions within the group of elements having the first, second, and third most variance, respectively. As such, using PCA will help to distribute the patent references in a 3D environment, such that a user can more easily distinguish what references are similar, and which are different, based on distances between the graphic objects representing the references in the 3D environment.

Displaying the Graphical 3D Environment Representing the 3D Space

At block 510 of method 500, after the computing device has determined the locations of the elements in the 3D space, the computing device causes a graphic display to display a 3D graphical environment representing the 3D space. The graphic display may be part of or directly coupled to the computing device performing method 500 or may be part of a separate device communicatively coupled to the computing device performing method 500 (e.g., via wired and/or wireless network(s)).

The 3D graphical environment is a graphical representation of the 3D space, and includes graphical objects at the respective locations of the elements in the 3D space, as determined at block 508. Each graphic object may be an orb, or another shape. Further, each graphical object can have a color and a size. In this regard, different graphic objects may have different shapes, different colors, and/or different sizes in order to convey additional information about the individual elements represented by the graphic objects.

To illustrate, consider again the 3D graphic environment 600 shown in FIGS. 6A to 7D. As shown, 3D graphic environment 600 includes graphic objects 602A to 602N, which each represent a different element (e.g., a patent reference) from the group determined at block 504. Note that FIGS. 6A to 6D include some graphic objects (i.e., orbs) that are not labeled. These unlabeled orbs in FIGS. 6A to 6D represent additional patent references from the group determined at block 504. The lack of labeling on some patent-reference orbs is intended to simplify these drawings. As such, the presence of a label or lack thereof should not be interpreted as indicating a substantive difference between orbs, unless such a difference is described explicitly herein.

In a further aspect, the orbs 602A to 602N may have one or more graphical or visual characteristics, such that the one or more visual characteristics of a given orb provide further information about the patent reference represented by the orb. Accordingly, an exemplary method such as method 500 could further involve the computing device determining one or more visual characteristics for the graphic object corresponding to each of one or more of the elements, based on one or more second attributes or characteristics of the corresponding element. (Note that the second attribute(s) may be different from the first attributes that are used to determine the locations of the graphic objects in the 3D space. However, in some implementations, it is possible that some or all of first attributes could also be used as second attribute(s) that are represented by the visual characteristics of the graphic objects for the elements.)

For example, a certain attribute or attributes of a patent reference can be indicated by visual characteristic(s) of the orb representing the patent reference in 3D environment 600. For instance, different orbs can have different sizes (e.g., dimensions) in the 3D space, different shapes, and/or have different colors or patterns, which indicate differences in certain attributes between the represented patent references.

In 3D environment 600, the orbs can be color coded or shaded to different degrees, based on the assignees. More specifically, a different color may be assigned to each assignee having a patent represented in 3D environment 600. As such, patent references assigned to the same entity are represented by orbs of the same color, such that the user can quickly identify references assigned to a particular common entity, and quickly determine when references are assigned to different entities.

In a further aspect of 3D environment 600, orbs 602A to 602N are sized according an attribute that indicates the importance, significance, or likelihood that a patent reference is of interest to the user. Examples of such attributes include, a count of backward citations, a count of forward citations, a number of blocking actions generated by the patent reference, a quantitative value indicating a breadth of the patent claims, independent claim word count (perhaps with lower word count being interpreted as indicative of a more valuable patent), total claim count, total number of independent claims, and/or a quantitative measure of litigation success (or lack thereof) associated with the patent reference, among other possibilities. Generally, when such an attribute indicates that a patent reference is or could be more significant or valuable, relative to other patent references in the represented group, the orb representing the patent reference will be larger (e.g., have a larger radius), and vice versa.

Note that when a first orb (or another graphic object) representing a first patent reference (or another type of element) is referred to as being larger in the 3D space than a second orb for a second reference, this means that the volume occupied by the first orb in the coordinate system of the 3D space (e.g., a world coordinate system) is larger than the volume occupied by the second orb in the coordinate system of the 3D space. At the same time, the apparent size of objects (e.g., in the coordinate system of a graphic display) can vary as the user moves throughout the 3D environment, such that the apparent size of an orb increases and decreases as the user moves closer to and further from the orb, respectively. Thus, in a virtual- or augmented-reality 3D environment such as that shown in FIGS. 6A to 6D, it is possible for the larger first orb to appear smaller than the second orb, because the user is closer to the second object than the first object, such that the smaller second objects occupies a larger area in the display coordinate system.

In a further aspect of 3D environments 600 and 700, each orb includes a textual label, which indicates another attribute of the represented patent references. In the example illustrated in FIGS. 6A to 6D, the respective textual label of each orb 602A to 602N indicates the assignee of the corresponding patent reference. Similarly, in FIGS. 7A to 7E, orbs 702A to 702E and orbs 702G-702J each have a textual label indicating the assignee of the corresponding patent reference. However, the textual label of orb 702F indicates the patent number of its represented patent. This difference may occur for various reasons, such the assignee electing not to be listed on the face of the patent and/or there being no assignee (because the inventor(s) still own the patent), among other possibilities. Note also that 3D environments 600 and 700 also include interactive graphic features 606E and 706E, respectively, which allows the user to switch between the textual labels for orbs between showing assignees and showing patent numbers.

FIG. 6A to 6D also include graphic "signposts" 604A to 604E, which indicate conceptual areas or volumes within the larger 3D space. More specifically, each signpost 604A to 604E is a textual representation of a key term relating to the technology space and/or patent owner for which the larger 3D is provided. In FIGS. 6A to 6D, signposts 604A to 604E take the form of key terms (i.e., attributes) that were determined at block 506 of method 500.

In order to place signposts 604A to 604E in the 3D environment 600, an implementation of method 500 could further involve the computing device determining locations for the signposts in the 3D space represented by 3D environment 600. More generally, an example method such as method 500 may involve determining, by the computing device, for one or more of the attributes determined at block 506 (and possibly other attributes as well), a respective location in the 3D space. In some embodiments, the location for each signpost may be determined such that the signpost gives the user a visual indication as to where they are located in the 3D space for the larger technology space. In particular, a signpost for a given key term may be placed in the 3D space such that it is generally closer to the orb(s) representing patent reference(s) that are most relevant to the given key term. Thus, the user can quickly focus on patents relevant to a particular key term in the larger technology space by moving to the particular signpost in the 3D environment 600.

Note that some graphic signposts in FIGS. 6A to 6D are not labeled. The unlabeled signposts in FIGS. 6A to 6D represent additional key terms that were determined at block 506. The lack of labeling on some signposts is intended to simplify these drawings. As such, the presence of a label or lack thereof should not be interpreted as indicating a substantive difference between signposts, unless such a difference is described explicitly herein.

In a further aspect, when the signposts are the same or overlap with the attributes (e.g., key terms) that are used to determine the locations of the patent-reference orbs 602A to 602M (e.g., via use of PCA), this can result in patent references that are highly relevant to the same key term being located near to one another in the 3D space. Accordingly, the signpost for a given key term can be placed close to or between a subset of the references that are most relevant to the key term. By placing signposts for all or a number of the key terms in this manner, the user may easily be able to identify and move between sub-spaces, areas, or "orbs" in the 3D space where patent references relevant to specific sub-topics or sub-areas of the larger technology space represented in the 3D environment 600.

As noted above, a computing device uses a slightly different approach, based on different parameters, to determine the group of patents that are visualized in the 3D environment 700 shown in FIGS. 7A to 7E. And, as further noted above, the process of determining attributes (e.g., key terms) used to locate graphic objects representing the determined group of patents (e.g., orbs 702A to 702J) in the 3D space may also be accomplished differently when generating 3D environment 700, as compared to 3D environment 600. However, once the group of patents for the 3D space and the attributes are determined, the locations of patent-reference orbs 702A to 702J, and the locations of signposts 704A to 704E corresponding to key-term attributes, may be determined in a similar manner as described in reference to the orbs and signposts of 3D environment 600. Further, the visual characteristics of orbs 702A to 702J may be indicative of one or more attributes of the represented patterns in the same or a similar manner as described in reference to orbs 602A to 602M.

Navigation in the 3D Environment

Referring back to method 500, block 512 involves the computing device enabling user interaction with the 3D graphical environment and one or more of the graphical objects therein.

In one aspect, the computing device may provide for movement in a virtual- or augmented-reality environment based on various types and/or modalities of user input, such as those described herein. In some implementations, a 3D environment may allow for a user to move with six degrees of freedom within the environment. However, embodiments allowing for more restricted movement are also possible. For example, some implementations could provide a VR environment where a user can change their FOV via head movement, but is placed in a fixed location in the environment. Other examples are also possible.

In a further aspect, some embodiments may allow the user to visually "move" or "travel" in time. Such embodiments might be considered to be "four dimensional" (4D), due to the ability to visually travel forward and/or backward in time. Also, a user can allow time to elapse, thus experiencing the appearance of patents as they were historically invented. The future can also be estimated with prediction models, with orbs appearing in the most likely position of invention. Or, regions can be colored with heat maps, where patents are more likely to be invented in "hotter" regions. The heat maps can be colored or identified by the most likely inventing firm or inventor as well. In some embodiments, this can be accomplished by segmenting the whole technology space into subspace regions or cubes, and then estimating spatial logit or Poisson models.

To illustrate a "4D" environment, consider the sequence illustrated by FIGS. 6A to 7D. More specifically, FIGS. 6A to 6D collectively illustrate a sequence (although not necessarily a consecutive sequence), where the 3D environment 600 initially displays the patent landscape for the assignee "Uber" in 2003 in FIG. 6A, and animates changes in the landscape as it moves from FIG. 6A to FIG. 6B (e.g., changes between 2003 and 2013), and from FIG. 6B to FIG. 6C (e.g., changes between 2013 and 2016).

FIGS. 7A to 7E provide another sequence showing how an example graphical environment 700 visualizes changes in the patent landscape for a technology space over time. More specifically, FIG. 7A initially displays the patent landscape for the "autonomous vehicle" technology space in 1982. The sequence then shows changes in the "autonomous vehicle" space moving from 1982 in FIG. 7A to 2016 in FIG. 7D. (It should be understood that this sequence is likely representative of a small sampling of frames that provide the animation visualizing changes over time.)

Further, environments 600 and 700 each include a graphic interface feature 606A and 706A (which in both examples is a slider). These sliders 606A and 706A allow the user to move forward and/or backward in time within the 3D environments 600 and 700, respectively. As such, the user can quickly ascertain when patent references become more or less important over time, and/or when certain assignees become more or less significant in a technology space over time, by observing changes when the corresponding orbs become larger or smaller, respectively. Further, by observing changes in density and/or size of patent-reference orbs around various key-term signposts in environments 600 and 700, a user may be able to visually understand and predict sub-spaces within the larger technology space that become more or less important over time and in the future.

Use of Sparse PCA to Populate 3D Space

In a variation on method 500, sparse principal component analysis ("sparse PCA") could be used to determine the locations of elements (e.g., coordinates of patent-reference orbs) in a 3D virtual- or augmented-reality environment. When sparse PCA is utilized, a set of key terms corresponding to the group of elements can be determined, in a similar manner as described above in conjunction with other techniques. However, sparse PCA significantly reduces the number of key terms utilized when generating the n-dimensional vector for each element, and thus reduces the size of the m×n matrix for the group of elements, which is analyzed in the same or a similar manner as when "standard" PCA is utilized (e.g., analyzing the key-term matrix for the group to reduce the matrix to three principle components having the greatest variance across the group of elements). Thus, sparse PCA can reduce the computational complexity of implementing method 500, as compared to other PCA techniques and similar approaches.

When sparse PCA is utilized, the axes of the 3D space (and thus the graphical 3D environment) are defined by first, second, and third principal components. Further, different sets of attributes (e.g., different sets of key terms) may be mapped to opposing ends of each principal component axes. These sets of attributes at opposing ends of principal-component axes, can help the user understand the conceptual meaning of a given patent-reference orb's location within the 3D environment.

For example, utilization of sparse PCA in method 500 can provide, a measure of loading onto the first principal component, a measure of loading onto the second principal component, and a measure of loading onto the third principal component, for each key term that is considered as part of the analysis. In such embodiments, an example method can further involve determining, for each of the three axes of the 3D space: (a) a subset of one or more key terms having the most positive loading measures with respect to the principal component represented by the axis, and (b) a subset of one or more key terms having the most negative loading measures with respect to the principal component represented by the axis. In such embodiments, the 3D graphical environment can further include, for each of the three principal-component axes: (a) a graphical indication of the subset of key terms having the most positive loading measures with respect to the given axis, displayed at or near a first end or first half of the given axis in the 3D environment, and (b) a graphical indication of the subset of the key terms having the most negative loading measures with respect to the given axis, displayed at or near a second end or second half of the given axis (e.g., on the opposite side of the origin from the set of most positively-loading key terms for the principal component).

Figure 8:
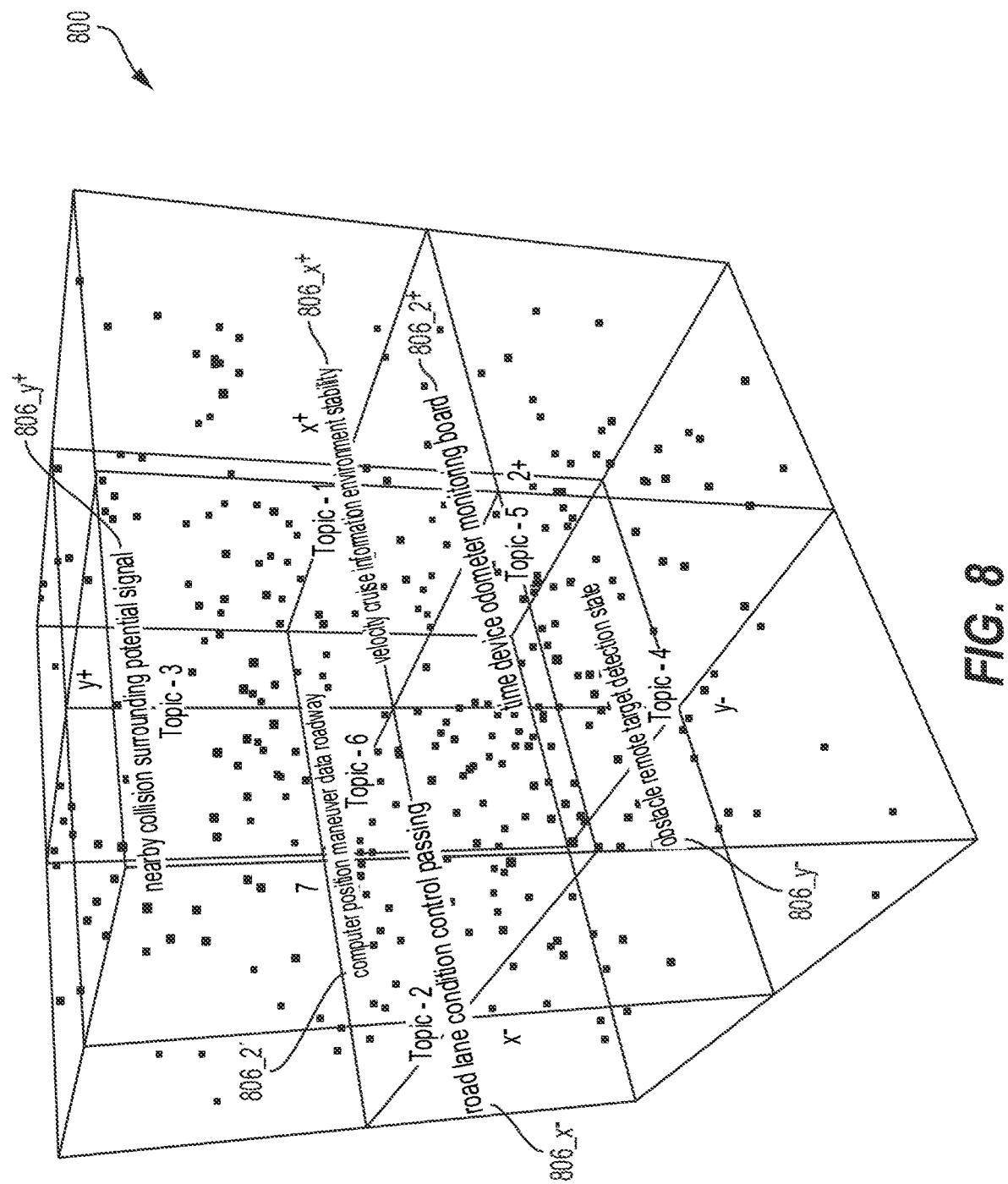
FIG. 8 is a simplified illustration of another 3D graphical environment provided in accordance with example embodiments.

For example, FIG. 8 shows a 3D environment 800 where sparse PCA is utilized to generate a 3D environment for patents related to "autonomous driving sensing." As shown, 3D environment 800 is defined by x, y, and z axes, with each axis having a positive and negative direction from an origin 802. Further, a set of key terms $806\_x^+$, $806\_x^-$, $806\_y^+$, $806\_y^-$, $806\_z^+$, and $806\_z^-$, respectively, is displayed for each direction on each axis $x^+$, $x^-$, $y^+$, $y^-$, $z^+$, and $z^-$, respectively. In particular, sparse PCA applied to patents from the "autonomous driving sensing" technology space yields the following key-term lists for the axes of 3D environment 800:

$x^+$: velocity, cruise, information, environment, stability
$x^-$: road, lane condition, control, passing
$y^+$: nearby, collision, surrounding, potential, signal
$y^-$: obstacle, remote, target, detection state
$z^+$: time, device, odometer, monitoring board
$z^-$: computer, position, maneuver, data, roadway Further, in the illustrated example, each direction of each axis includes a topic $808\_x^+$, $808\_x^-$, $808\_y^+$, $808\_y^-$, $808\_z^+$, and $808\_z^-$ pertaining to its set of key terms. Specifically, the topic $808\_x^+$ for key-term group $806\_x^+$ is "TOPIC_A", the topic $808\_x^-$ for key-term group $806\_x^-$ is "TOPIC_B", the topic $808\_y^+$ for key-term group $806\_y^+$ is "TOPIC_C", the topic $808\_y^-$ for key-term group $806\_y^-$ is "TOPIC_D", the topic $808\_z^+$ for key-term group $806\_z^+$ is "TOPIC E", and the topic $808\_z^-$ for key-term group $806\_z^-$ is "TOPIC_F." Note that a "topic" may also be referred to as a "theme," or by another name, and can be any term or phrase that summarizes or indicates some common concept for a set of attributes (e.g., a set of key terms).

As noted above, block 508 may employ sparse PCA to determine the first three principal components for each element in the group (e.g., each patent reference), which thus provides a three dimensional vector for each element. The vector may then be used to place the element in the 3D space. For example, 3D environment 800 includes graphic object (in this case, dots) for each patent reference from a group of patents in the autonomous vehicle sensing space. As a result, the location of a dot with respect to each axis is indicative of a relevancy of the corresponding patent reference to the topics or themes indicated by the axis. For example, a dot that has a high positive-valued x-coordinate, a high positive-valued y coordinate, and a low-valued (positive or negative) or zero z coordinate, indicates the corresponding patent reference is highly relevant to the topics of "velocity" and "collision". Since each axis direction corresponds to an understandable topic of theme, 3D environment 800 may help a user to quickly understand a conceptual meaning for any location in the 3D space.

IV. Additional Features

Switching Between Views of the Same or Different Element Group in a 3D Environment In some embodiments, a computing device may provide interactive features and/or allow for other types of user input to change the structure of the 3D space represented by the 3D environment 600, 700, and/or 800. For example, a user may be able to interact a graphical interface feature or another type of interface feature, or provide another type of input, to toggle between different views of the same set of elements. In other words, while interacting with a 3D environment, such as 3D environment 600, 700, or 800, the user could provide input indicating different parameter(s) and/or attribute(s), such that a new 3D space is defined, and the same group of elements is re-mapped to the re-defined 3D space. In other embodiments, the user can specify a different set of key words and thus toggle into a different technology space.

In some embodiments, the user could indicate a different variance reduction, or adjust the current variance reduction, in order to update or toggle between different "views" (e.g., different spatial arrangements) of patent-reference orbs. In particular, when the variance reduction changes, this will change the attributes that define the 3D space (e.g., by changing the locations of the attribute signposts in 3D environment 600 or 700, or changing the key-term sets that define the axes in 3D environment 800), such that the elements (e.g., patent references) are re-located in the 3D space according to the updated attributes.

The 3D environment may visually represent a transition between different 3D views of a group of elements by moving and/or changing labels on the axes and/or boundaries of the 3D environment, and/or by moving attribute signposts within the environment. Additionally, to visually represent such a transition, the computing device can re-determine the locations of the elements in the represented group, and move the graphic icons representing the elements (e.g., patent-reference orbs) to the re-determined locations in the 3D environment. Note that the change in locations of elements could be visually represented by animating movements of the corresponding graphic objects in the 3D environment (e.g., by showing movement of the elements between their initial locations and their re-determined locations), or by a sudden change to the 3D environment (e.g., refreshing the 3D environment such that graphic objects appear to "jump" instantaneous to new locations). Other visual representations of the location changes are also possible.

V. Conclusion

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The invention claimed is:

1. A method comprising:
   receiving, by a computing device, input data indicating one or more parameters, wherein the one or more parameters relate to a type of element, wherein a database comprising multidimensional data includes a plurality of elements of the type;
   determining, by the computing device, a group of elements from the plurality of elements based at least in part on the one or more first parameters;
   determining, by the computing device, a plurality of first attributes based at least n part on the one or more parameters, the group of elements, or both;
   determining, by the computing device, for each element from the group, a respective element location in a three-dimensional (3D) space, wherein the respective element location is determined based on at least some of the plurality of first attributes;
   determining, by the computing device and for one or more of the first attributes, a respective attribute location in the 3D space, wherein the respective attribute location is indicative of a relationship of each element from the group to a respective attribute of the one or more of the first attributes;
   causing a graphic display device to display a 3D graphical environment representing the 3D space, wherein each element from the group is represented in the 3D graphical environment by a graphic object at the respectively determined element location of the element in the 3D space, and wherein the respective attribute location is represented in the 3D graphical environment by a respective attribute signpost; and
   enabling, by the computing device, user interaction with the 3D graphical environment and the graphic objects and the respective attribute signposts.

2. The method of claim 1, wherein the 3D graphical environment comprises an augmented reality space.

3. The method of claim 1, wherein each graphic object comprises an orb.

4. The method of claim 1, wherein the one or more parameters comprise an entity parameter indicating a first entity comprising a person, a group of persons, a legal entity, or a group of legal entities, and wherein determining the group of elements based at least in part on the one or more parameters comprises:
   determining a group of elements having a certain relationship or set of relationships to the first entity.

5. The method of claim 1, wherein determining the respective element location in the 3D space for each element from the group comprises:
   for each element from the group, determining a vector based on the plurality of first attributes.

6. The method of claim 5, wherein the plurality of first attributes comprises a plurality of key terms corresponding, and wherein determining the vector for each element comprises determining the vector for the element based on frequencies of the key terms in the element.

7. The method of claim 5, wherein determining the vectors for the elements comprises using principal component analysis (PCA) to generate a respective three-component vector for each of the elements in the group.

8. The method of claim 1, wherein the plurality of first attributes comprise a plurality of key terms, and wherein determining, for each element from the group, the respective element location in the 3D space comprises:
   carrying out principal component analysis (PCA) based on the plurality of key terms to determine, for each element, respective 3D coordinates in the 3D space.

9. The method of claim 8, further comprising:
   for each of the three axes of the 3D space, determining (a) a subset of one or more key terms having the most positive loading measures with respect to the principal component represented by the axis, and (b) a subset of one or more key terms having the most negative loading measures with respect to the principal component represented by the axis;
   wherein causing the graphic display device to display the 3D graphical environment further comprises, for each of the three axes of the 3D space, causing the graphic display device to display:

at or near a first end of the given axis, a graphical indication of the subset of key terms having the most positive loading measures with respect to the given axis; and at or near a second end of the given axis, a graphical indication of the subset of the key terms having the most negative loading measures with respect to the given axis.

10. The method of claim 1, further comprising, before displaying the 3D graphical environment, determining one or more graphic properties for each graphic object representing one of the elements from the group.

11. The method of claim 10, wherein determining the one or more graphic properties for each graphic object comprises:

determining one or more of the following properties for each graphical object: (a) a color, (b) a size in the 3D space, or (c) a shape.

12. The method of claim 1, wherein the plurality of elements comprise a plurality of textual documents, such that a graphical object represents each textual document in the 3D environment.

13. The method of claim 12, wherein the plurality of textual documents comprises one or more of the following types of documents: (a) a patent document, (b) a patent claim, (c) a virtual patent marker, (d) a scientific publication, (e) product description, or (f) combinations of any of (a) through (e).

14. The method of claim 1, wherein the graphical 3D environment visualizes the patent landscape for at least one technology space, and wherein the at least one technology space comprises a technology space of patents assigned to a particular assignee and a matched sample of one or more patents assigned to one or more other assignees.

15. The method of claim 14, wherein the determined first attributes comprise a plurality of key terms related to the at least one technology space, and wherein each key term is represented in the graphical 3D environment by a respective attribute signpost at a respective attribute location.

16. The method of claim 1, wherein the plurality of first attributes comprise a plurality of key terms, and wherein determining, for each element from the group, the respective element location in the 3D space comprises:

carrying out sparse principal component analysis (PCA) based on a subset of the plurality of key terms to determine, for each element, respective 3D coordinates in the 3D space.

17. The method of claim 16, wherein carrying out the sparse PCA provides a respective measure of loading of each key term from the subset onto a first principal component, a second principal component, and a third principal component, and wherein axes the 3D space are defined by the first, second, and third principal components.

18. The method of claim 17, further comprising:

for each of the three axes of the 3D space, determining (a) a subset of one or more key terms having the most positive loading measures with respect to the principal component represented by the axis, and (b) a subset of one or more key terms having the most negative loading measures with respect to the principal component represented by the axis;

wherein causing the graphic display device to display the 3D graphical environment further comprises, for each of the three axes of the 3D space causing the graphic display device to display:

at or near a first end of the given axis, a graphical indication of the subset of key terms having the most positive loading measures with respect to the given axis; and at or near a second end of the given axis, a graphical indication of the subset of the key terms having the most negative loading measures with respect to the given axis.

19. A system comprising:

a display interface operable to control a graphic display;

at least one processor; and program instructions stored on a non-transitory computer readable medium and executable by the at least one processor to:

receive input data indicating one or more parameters, wherein the one or more parameters relate to a type of element, wherein a database comprising multidimensional data includes a plurality of elements of the type;

determine a group of elements from the plurality of elements based at least in part on the one or more first parameters;

determine a plurality of first attributes based at least in part on the one or more parameters, the group of elements, or both;

determine, for each element from the group, a respective element location in a three-dimensional (3D) space, wherein the respective element locations of the elements are determined based on the plurality of attributes;

determine, for one or more of the first attributes, a respective attribute location in the 3D space, wherein the respective attribute location is indicative of a relationship of each element from the group to a respective attribute of the one or more of the first attributes;

cause the graphic display to display a 3D graphical environment representing the 3D space, wherein each element from the group is represented in the 3D graphical environment by a graphic object at the respectively determined element location of the element in the 3D space, and wherein the respective attribute location is represented in the 3D graphical environment by a respective attribute signpost; and enable user interaction with the 3D graphical environment and the graphic objects and the respective attribute signposts.

20. The system of claim 19, wherein the 3D graphical environment comprises an augmented reality space.

21. The system of claim 19, wherein the one or more parameters comprise an entity parameter indicating a first entity comprising a person, a group of persons, a legal entity, or a group of legal entities, and wherein, to determine the group of elements, the program instructions are further executable to determine a group of elements having a certain relationship or set of relationships to the first entity.

22. The system of claim 19, wherein, to determine the respective element location in the 3D space for each element from the group, the program instructions are further executable to:

for each element from the group, determine a vector based on the plurality of first attributes.

23. The system of claim 22, wherein the first attributes comprise one or more key terms, and wherein the vector for each element is determined based on a frequency of the one or more key terms in the element.

24. The system of claim 22, wherein the vectors for the elements in the group are determined using PCA analysis to generate a respective three-component vector for each element in the group.

25. The system of claim 19, further comprising program instructions stored on a non-transitory computer readable medium and executable by the at least one processor to, before displaying the 3D graphical environment, determine one or more graphic properties for each graphic object representing one of the elements from the group.

26. The system of claim 25, wherein the one or more graphic properties for each graphic object comprise one or more of the following graphic properties: (a) a color, (b) a size in the 3D space, or (c) a shape.

27. The system of claim 19, wherein each graphical object represents a patent document, and wherein the graphical 3D environment visualizes the patent landscape for at least one technology space.

28. The system of claim 27, wherein the at least one technology space comprises a technology space of patents assigned to a particular assignee and a matched sample of one or more patents assigned to one or more other assignees.

29. The system of claim 27, wherein the first attributes comprise a plurality of key terms related to the at least one technology space, and wherein each key term is represented in the graphical 3D environment by a respective attribute signpost at a respective attribute location.

30. A non-transitory computer readable storage medium having stored thereon instructions that, when executed by a computing device, cause the computing device to perform operations comprising:

receiving, by a computing device, input data indicating one or more parameters, wherein the one or more parameters relate to a type of element, wherein a database comprising multidimensional data includes a plurality of elements of the type;

determining, by the computing device, a group of elements from the plurality of elements based at least in part on the one or more first parameters;

determining, by the computing device, a plurality of first attributes based at least in part on the one or more parameters, the group of elements, or both;

determining, by the computing device, for each element from the group, a respective element location in a three-dimensional (3D) space, wherein the respective element location is determined based on at least some of the plurality of first attributes;

determining, by the computing device and for one or more of the first attributes, a respective attribute location in the 3D space, wherein the respective attribute location is indicative of a relationship of each element from the group to a respective attribute of the one or more of the first attributes;

causing a graphic display device to display a 3D graphical environment representing the 3D space, wherein each element from the group is represented in the 3D graphical environment by a graphic object at the respectively determined element location of the element in the 3D space, and wherein the respective attribute location is represented in the 3D graphical environment by a respective attribute signpost; and enabling, by the computing device, user interaction with the 3D graphical environment and the graphic objects and the respective attribute signposts.

31. The method of claim 1, wherein enabling the user interaction comprises:

receiving, by the computing device, a user preference for a navigable volume, a navigable dimension, or both; and modifying, by the computing device, the 3D graphical environment based on the user preference.

32. The method of claim 1, wherein the respective attribute location is a centroid of respectively determined element locations of elements from the group.

* * * * *